(12) United States Patent
Katz et al.

(10) Patent No.: US 9,718,048 B2
(45) Date of Patent: Aug. 1, 2017

(54) OXIDE MATERIALS AND SYNTHESIS BY FLUORIDE/CHLORIDE ANION PROMOTED EXFOLIATION

(71) Applicants: Alexander Katz, Richmond, CA (US); Isao Ogino, Hokkaido (JP); Stacey Ian Zones, San Francisco, CA (US)

(72) Inventors: Alexander Katz, Richmond, CA (US); Isao Ogino, Hokkaido (JP); Stacey Ian Zones, San Francisco, CA (US)

(73) Assignees: The Regents of the University of California, Oakland, CA (US); Chevron U.S.A. Inc., San Ramon, CA (US)

( * ) Notice: Subject to any disclaimer, the term of this patent is extended or adjusted under 35 U.S.C. 154(b) by 409 days.

(21) Appl. No.: 14/587,527

(22) Filed: Dec. 31, 2014

(65) Prior Publication Data

US 2015/0118148 A1   Apr. 30, 2015

Related U.S. Application Data

(62) Division of application No. 13/161,091, filed on Jun. 15, 2011, now Pat. No. 9,522,390.

(60) Provisional application No. 61/421,906, filed on Dec. 10, 2010.

(51) Int. Cl.
| | |
|---|---|
| *C01B 39/02* | (2006.01) |
| *C01B 39/38* | (2006.01) |
| *C01B 39/40* | (2006.01) |
| *C01B 39/46* | (2006.01) |
| *C01B 39/48* | (2006.01) |
| *B01J 29/70* | (2006.01) |
| *B01J 29/65* | (2006.01) |
| *B01J 29/04* | (2006.01) |
| *B01J 37/00* | (2006.01) |
| *B01J 37/34* | (2006.01) |
| *B01J 29/86* | (2006.01) |
| *B01J 35/00* | (2006.01) |
| *B01J 35/10* | (2006.01) |

(52) U.S. Cl.
CPC ......... *B01J 29/7038* (2013.01); *B01J 29/041* (2013.01); *B01J 29/65* (2013.01); *B01J 29/70* (2013.01); *B01J 29/7088* (2013.01); *B01J 29/86* (2013.01); *B01J 35/002* (2013.01); *B01J 35/1057* (2013.01); *B01J 35/1061* (2013.01); *B01J 37/0072* (2013.01); *B01J 37/343* (2013.01); *C01B 39/026* (2013.01); *C01B 39/38* (2013.01); *C01B 39/40* (2013.01); *C01B 39/46* (2013.01); *C01B 39/48* (2013.01); *B01J 2229/34* (2013.01); *B01J 2229/37* (2013.01); *B01J 2229/38* (2013.01)

(58) Field of Classification Search
CPC ....... C01B 39/026; C01B 39/38; C01B 39/40; C01B 39/46; C01B 39/48; B01J 29/86; B01J 29/7038; B01J 29/7088; B01J 29/70; B01J 29/65; B01J 29/041; B01J 37/343; B01J 2229/34; B01J 2229/37; B01J 2229/38

See application file for complete search history.

(56) References Cited

U.S. PATENT DOCUMENTS

| | | |
|---|---|---|
| 6,231,751 B1 | 5/2001 | Canos et al. |
| 6,855,855 B2 | 2/2005 | Van Den Brink et al. |
| 2003/0003046 A1 | 1/2003 | Canos et al. |
| 2004/0003046 A1 | 1/2004 | Grabelsky et al. |
| 2004/0138051 A1 | 7/2004 | Shan et al. |
| 2004/0220047 A1 | 11/2004 | Doyle et al. |
| 2006/0021913 A1 | 2/2006 | Ketley et al. |
| 2006/0074267 A1 | 4/2006 | Cao et al. |
| 2007/0227351 A1 | 10/2007 | Garcia-Martinez |
| 2008/0206124 A1 | 8/2008 | Jang et al. |

OTHER PUBLICATIONS

Ogino et al, "Delamination of Layered Zeolite Precursors under Mild Conditions: Synthesis of UCB-1 via Gluoride/Chloride Anion-Promoted Exfoliation", JACS (Feb. 22, 2011) pp. 3288-3291.*
Eilerstsen et al, "Nonaqueous Fluoride/Chloride Anion-Promoted Delamination of Layered Zeolite Precursors: Synthesis and Characterization of UCB-2", Chemistry of Materials, (Nov. 23, 2011), pp. 5404-5408.*
Ogino et al, "Heteroatom-Tolerant Delamination of Layered Zeolite Precursor Materials", Chemistry of Materials, (Feb. 27, 2013), pp. 1502-1509.*
Office Action from corresponding Chinese Application No. 201180065601.5 mailed Aug. 1, 2014.
J. W. Kriesel et al., "General Route to Homogeneous, Mesoporous, Multicomponent Oxides Based on the Thermolytic Transformation of Molecular Precursors in Non-polar Media", Advanced Materials, 2001, vol. 13., No. 5, pp. 331-335.
A. Corma et al., "New Aluminosilicate and Titanosilicate Delaminated Materials Active for Acid Catalysis, and Oxidation Reactions Using H2O2", J. Am. Chem. Soc., 2000, vol. 122, pp. 2804-2809.
A. Corma et al., "ITQ-18 a new delaminated stable zeolite", Chemcomm Communication, 2001, pp. 2642-2643.
R. Schenkel et al., "Chemical and structural aspects of the transformation of the MCM-22 precursor into ITQ-2", Studies in Surface Science and Catalysis 142, 2002, pp. 69-76.

(Continued)

*Primary Examiner* — David M Brunsman
(74) *Attorney, Agent, or Firm* — E. Joseph Gess; Melissa M. Hayworth

(57) ABSTRACT

The present invention is directed to the synthesis of novel delaminated layered zeolite precursor materials prepared by fluoride/chloride anion-promoted exfoliation. The method comprises, for example, using a combination of fluoride and chloride anions at a mild pH in a non-aqueous solution to affect delamination of a layered zeolite precursor, generally comprising an organic solvent. The method may be used in conjunction with either acidification or sonication, or both. The resulting delaminated zeolite precursors are then isolated. Precursors that are then isolated lack amorphous silica content. The UCB-1 product is an example of such a novel oxide material and is obtained in yields in excess of 90% without the need for sonication.

17 Claims, 27 Drawing Sheets

(56) References Cited

OTHER PUBLICATIONS

A. Corma et al., "Characterization and Catalytic Activity of MCM-22 and MCM-56 Compared with ITQ-2", Journal of Catalysis, 2000, vol. 191, pp. 218-224.
M. A. Camblor et al., "Synthesis in fluoride media and characterisation of aluminosilicate zeolite beta", Journal of Materials Chemistry, 1998, vol. 8, No. 9, pp. 2137-2145.
Y. Wu et al., "Framework-Substituted Lanthanide MCM-22 Zeolite: Synthesis and Characterization", J. Am. Chem. Soc., 2010, vol. 132, pp. 17989-17991.
International Search Report corresponding to PCT Application No. PCT/US2011/063990, mailed on Apr. 19, 2012.

\* cited by examiner

OXIDE MATERIALS AND SYNTHESIS BY FLUORIDE/CHLORIDE ANION PROMOTED EXFOLIATION

CROSS REFERENCE TO RELATED APPLICATION

This application is a divisional of U.S. patent application Ser. No. 13/161,091, filed Jun. 11, 2011, which claims benefit under 35 USC 119 of Provisional Application 61/421,906 filed Dec. 10, 2010, the contents of both documents incorporated herein by reference in their entirety.

BACKGROUND OF THE INVENTION

Field of the Invention

Provided are new oxide materials consisting of delaminated layered zeolite precursors and a method for synthesizing the materials under mild conditions. More specifically, provided is the synthesis of delaminated layered zeolite precursor materials such as UCB-1 to UCB-6 by fluoride/chloride anion-promoted exfoliation.

Description of the Related Art

The emergence of a new class of catalysts consisting of delaminated layered zeolite precursors expands the range of reactions that zeolites can catalyze by providing access for larger reactant molecules. ITQ-2 in particular represents the first example of such a material, and consists of micropores derived from the zeolite precursor material, MCM-22(P), which are imbedded within thin and accessible sheets. See, for example, U.S. Pat. No. 6,231,751. These micropores enable shape-selective catalysis. Other delaminated zeolite materials include ITQ-6 synthesized by delamination of PREFER, and ITQ-18, synthesized by delamination of Nu-6 (1). See, for example, Corma et al., "Aromatics Alkylation", U.S. Pat. No. 6,855,855; "New Aluminosilicate and Titanosilicate Delaminated Materials Active for Acid Catalysis, and Oxidation Reactions Using $H_2O_2$", J. Am. Chem. Soc., 2000, vol. 122, pp. 2804-2809; and Corma et al., "ITQ-18 a new delaminated stable zeolite", Chem. Commun., 2001, pp. 2642-2643.

The synthesis of ITQ-2 and other delaminated layered zeolite precursors has to-date required a high pH medium during precursor material swelling, typically in the pH range of 13.5-13.8. Based on the high solubility of silica in such basic aqueous solution, proof of partial amorphization of the zeolite precursor layers during delamination is evident via transmission electron microscopy (See Lercher et al., "Chemical and structural aspects of the transformation of the MCM-22 precursor into ITQ-2", Studies in Surface Science and Catalysis, 142, pp. 69-76) and clearly identifiable $Si(OH)_2$ resonances, which must be due to amorphous silica, in the $^{29}Si$ MAS NMR spectrum of ITQ-2 (See FIG. 4 in Corma et al., "Characterization and Catalytic Activity of MCM-22 and MCM-56 Compared with ITQ-2", Journal of Catalysis 2000, 191, 218-224.) This has motivated the search for milder conditions for delamination. While there has been notable success in decreasing the temperature from 353 K (80° C.) to room temperature during swelling, it has been impossible to achieve delamination under these milder conditions, since the material reverts back to the zeolite precursor after acidification of the swollen sample. A delaminated layered zeolite precursor material does not revert back to the layered zeolite precursor after acidification, and does not revert back to the calcined form of the layered zeolite precursor after calcination.

It would therefore be of great value to the industry if a synthesis for a new catalyst material of the class of delaminated layered zeolite precursors is discovered which involves milder conditions, particularly pH. Furthermore, it would be extremely cost effective to circumvent the need for sonication, if possible, when synthesizing a delaminated layered zeolite precursor material, since performing sonication operations industrially is known to oftentimes be prohibitively expensive. Also important is the successful preparation of the oxide material via delamination without the material either reverting back to the layered zeolite precursor after acidification or reverting back to the calcined form of the layered zeolite precursor after calcination.

It would also be of great value to the industry if a synthesis for a new catalyst material of the class of delaminated layered zeolite precursors is discovered which is effective yet flexible in the conditions which can be used for preparing such catalyst materials. An objective of the present invention is to provide a flexible process insofar as it can be used at milder pH values, either in organic solvents or in aqueous solution, and either with or without sonication. This flexibility in process conditions is not possible to achieve with the prior art.

SUMMARY OF THE INVENTION

Provided are novel delaminated zeolite precursor materials prepared by fluoride/chlorine anion-promoted exfoliation. The oxide material prepared by at least partial delamination of a layered zeolite precursor is essentially devoid of an amorphous silica phase. This is achieved through the use of chloride and fluoride anion exfoliation. The avoidance of the amorphous phase in the oxide materials of the present invention also preserves more integrity of the two-dimensional zeolite layers, as characterized, for example, by a more intense sharp peak in the 20-30 2θ/degrees range of their X-ray diffraction patterns compared to prior art delaminated layered zeolite materials such as ITQ-2, lack of resonances attributable to $Si(OH)_2$-$Q^2$ silicon-via $^{29}Si$ MAS NMR spectroscopy, and lack of amorphous phase via transmission electron microscopy.

In one embodiment, the method of preparing the delaminated layered zeolite precursor material comprises preparing an aqueous mixture of chloride and fluoride anions with a layered zeolite precursor material to be delaminated. The aqueous mixture is maintained at a pH of 12 or less, e.g., around 9, generally at a temperature in the range of about 5-150° C. to effect the desired delamination. An oxide material such as UCB-1 is then recovered after acidification and centrifugation, and can be obtained in yields exceeding 90 wt. %. The use of milder conditions, especially pH, during the synthesis using an aqueous solution substantially avoids the creation of an amorphous phase, whereas the obviation of sonication is a practical cost-effective advantage of the synthesis.

In another embodiment, the method of preparing the delaminated layered zeolite precursor comprises preparing a non-aqueous mixture of chloride and fluoride anions with a layered zeolite material to be delaminated. The mixture is heated at a temperature in the range of about 5-150° C. to effect the desired delamination. The non-aqueous mixture generally comprises an organic solvent such as dimethyl formamide (DMF). An oxide material such as UCB-2 is then recovered after acification and filtration, or, alternatively, an oxide material such as UCB-3 is then recovered after deionized water wash and filtration.

In another embodiment, the method of preparing the delaminated layered zeolite precursor comprises preparing a non-aqueous mixture, e.g., using an organic solvent such as dimethyl formamide, of chloride and fluoride anions with a layered zeolite material to be delaminated. After heating the mixture at a temperature in the range of from about 5-150° C. to affect the desired delamination, the mixture is subjected to sonication and filtration. An oxide material such as UCB-4, UCB-5 or UCB-6 is then recovered.

Among other factors, the present process permits one to prepare a delaminated zeolite precursor material by using a combination of chloride and fluoride anions, e.g., from a combination of alkylammonium fluoride and chloride surfactants. The process avoids the creation of an amorphous silica phase. When using an aqueous mixture, the process permits milder conditions of pH than have heretofore been possible. The pH can be less than 12, and essentially avoids the creation of an amorphous silica phase. For example, in an aqueous solution of pH 12 or less, delamination of a layered zeolite precursor material is achieved to provide a stable product, e.g., UCB-1. The process can also be performed in a non-aqueous mixture, with which sonication can be used or not used. Stable products such as UCB-2, UCB-3, UCB-4, UCB-5 and UCB-6 are achieved. The products themselves are novel as they demonstrate unique morphology and high structural integrity.

DETAILED DESCRIPTION OF THE INVENTION

Figure 1:
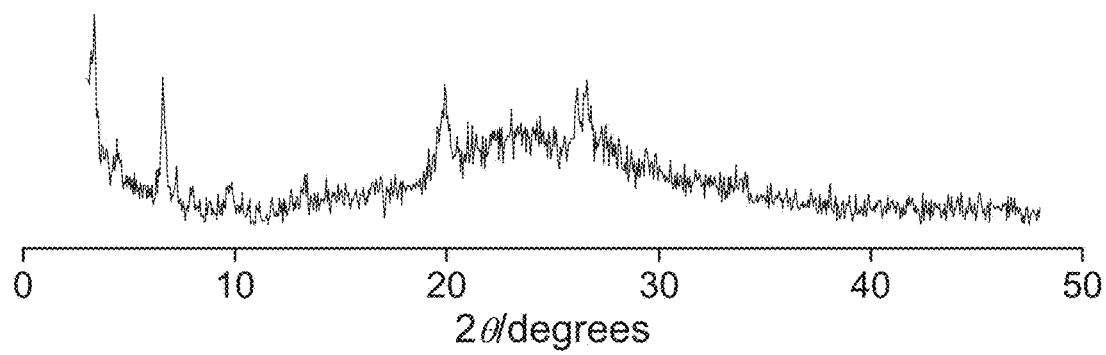
FIG. 1 shows a powder x-ray diffraction pattern characterizing MCM-22(P) (Si:Al ratio of 50) delaminated in the absence of chloride.

The present method involves halide anion delamination of a layered zeolite precursor material to provide a novel oxide material. An aqueous mixture or an organic solvent mixture of chloride and fluoride anions is used in affecting the delamination. Bromide anion can also be present. The mixtures are maintained at a temperature in the range of from 5-150° C. for a length of time sufficient to effect the desired delamination, e.g., for 30 minutes to one month. The mixture can then be subjected to sonication, or the process can be completed in the absence of sonication. The oxide product is recovered, often using acidification and/or centrifugation. The recovered oxide products recovered by the present halide anion delamination process are novel oxide products having unique morphology and high structural integrity. The present process allows one to prepare a delaminated layered zeolite precursor material efficiently and under milder conditions than has heretofore been known. The synthesis substantially avoids the creation of an amorphous phase, and can circumvent the need for sonication.

A zeolite is a crystalline three-dimensional assembly of tetrahedral atoms, each of which is surrounded by four oxygen atoms as ligands, so as to form $TO_4$ units where T represents a tetrahedral atom and can be, but is not limited to, silicon, germanium, vanadium, titanium, tin, aluminum, boron, iron, chromium, gallium, cerium, lanthanum, samarium, phosphorous, and a mixture thereof. These $TO_4$ units are interconnected through their corners. Zeolites can be but are not limited to aluminosilicates, aluminophosphates, heteroatom-substituted materials. A layered zeolite precursor material consists of two-dimensional zeolitic sheets that are interconnected via either non-covalent (e.g., hydrogen bonding) and/or covalent bonds, which when calcined lead to a three-dimensional zeolite.

When using an aqueous mixture, an aqueous mixture of chloride and fluoride anions, e.g., alkylammoniumhalides, and the layered zeolite precursor, the novel oxide product is prepared at a pH less than 12, e.g., about 9, and maintained at a temperature in the range of 5-150° C. for a length of time sufficient to effect the desired delamination. The oxide product is then recovered, e.g., by acidification to a pH of about 2 followed by centrifugation.

When instead using a non-aqueous mixture of chloride and fluoride anions, i.e., a mixture comprising an organic solvent, the mixture is also maintained at a temperature in the range of from 5-150° C. to effect desired delamination. The organic solvent can be any suitable organic solvent, which swells the starting material such as dimethyl formamide (DMF). The delaminated product can then be recovered from the mixture. Generally, acidification is used to recover the product. Sonication prior to recovery need not be employed, but sonication can be employed in the process if desired.

The oxide product obtained can comprise oxides of the formula $XO_2$ and $Y_2O_3$, wherein X represents a tetravalent element and Y represents a trivalent element, with the atomic ratio of X to Y being greater than 3. In one embodiment, X is silicon, germanium, vanadium, titanium, tin, or a mixture thereof, and Y is selected from the group consisting of aluminum, boron, iron, chromium, titanium, gallium, cerium, lanthanum, samarium, and a mixture thereof. See "Framework-substituted lanthanide MCM-22 zeolite: synthesis and characterization", J. Am. Chem. Soc., 2010, 132, pp. 17989-17991 for examples of the latter three. In another embodiment, X is silicon and Y is aluminum. The atomic ratio of X to Y is also often less than 200, or less than 100. In yet another alternate embodiment, the oxide product may contain pentavalent phosphorous as well as the elements defined above (e.g., as in an aluminophosphate material).

The layered zeolite precursors to be delaminated in accordance with the present process can be any layered zeolite material. The ultimate product will depend upon the starting material and the particular process steps used in the synthesis. Examples of suitable layered zeolite precursor materials include MCM-22 (P), SSZ-25, ERB-1, PREFER, SSZ-70 (e.g., Al-SSZ-70 or B-SSZ-70) and Nu-6 (1). When MCM-22 (P) is used, the novel oxide product UCB-1 is obtained.

The chloride and fluoride anions can be obtained from any source of the anions. Any compound which will provide the anions in aqueous solution can be used. The cation is not important. Providing the fluoride and chloride anions is important. The cations can be any cation, with the use of alkylammonium cations being suitable in one embodiment. The alkyl group of such a cation can be any length, and in one embodiment ranges from 1-20 carbons. Tetrabutylammonium cations in particular have been found useful. The molar ratio of chloride to fluoride anions can be 100 or less, generally from 100:1 to 1:100. In one embodiment, the ratio can range from 50:1 to 1:50.

Figure 2:
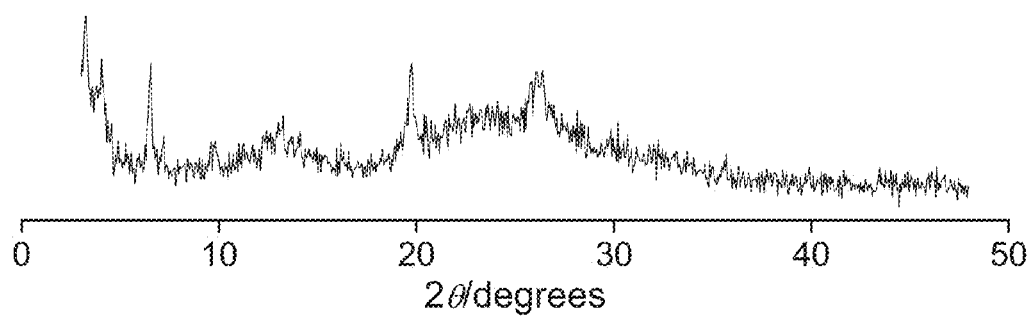
FIG. 2 shows a powder x-ray diffraction pattern characterizing MCM-22(P) (Si:Al ratio of 50) delaminated in the absence of fluoride.
Figure 3:
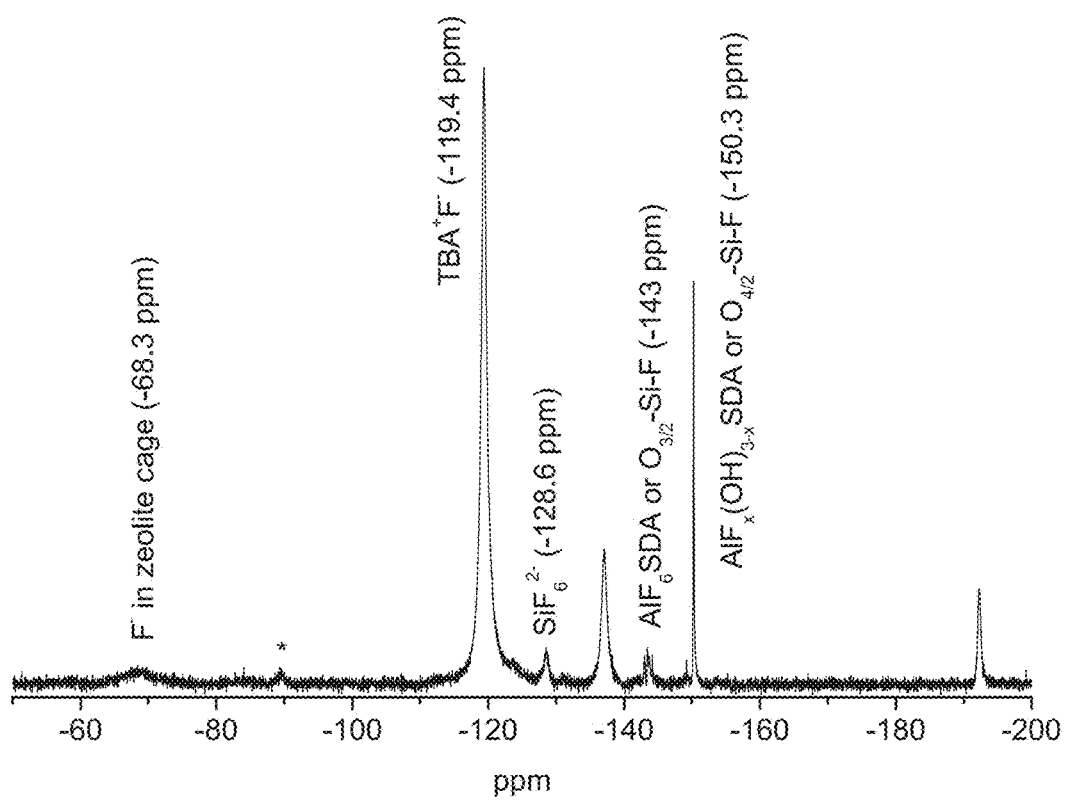
FIG. 3 is a $^{19}$F MAS NMR spectrum characterizing as-made UCB-1.

It is the combination of the fluoride and chloride anions which has been discovered to be important. When delamination was attempted with fluoride without chloride, the PXRD pattern of the dried product clearly showed retention of strong 001 and 002 peaks, indicating that efficient delamination requires chloride anions as well. See FIG. 1. On the other hand, fluoride is also a necessary component because delamination using only chloride in the absence of fluoride results in partial delamination, as shown in FIG. 2. The $^{19}F$ NMR spectrum characterizing the as-made UCB-1, shown in FIG. 3, shows a resonance at −128.6 ppm, which is attributable to $SiF_6^{-2}$. This is consistent with coordination of fluoride to Si atoms in the interlayer to facilitate delamination.

The pH used in the present synthesis when an aqueous mixture is used is lower than that generally used in delamination synthesis. The pH is generally 12 or less, but can be any pH which does not amorphasize the silica in the zeolite to create an amorphous silica phase. A pH of 12 or less generally accomplishes this task and thereby allows one to obtain a delaminated layered zeolite precursor material substantially without an amorphous phase. In another embodiment, the pH is 11 or less, and even 10 or less, with a pH of about 9 or less also being quite advantageous. A pH of approximately 9 is typically used in fluoride-mediated synthesis of zeolites—which otherwise require high pH (above 12). See Corma et al., "Synthesis in fluoride media and characterisation of aluminosilicate zeolite beta", Journal of Materials Chemistry, 1998, 8, pp. 2137-2145.

The temperature used in the process for either the aqueous or non-aqueous mixture can range widely. In general a temperature for the aqueous solution of from 5-150° C. is suitable. In another embodiment, the temperature can range from 50-100° C.

The length of time the zeolite is allowed to swell, and delaminate, in the aqueous solution can vary greatly. Generally, the time can vary from 30 minutes to one month. In one embodiment, the time ranges from 2 hours to 50 hours. In another embodiment, the time can range from 5 to 20 hours prior to collection of the product.

Figure 4:
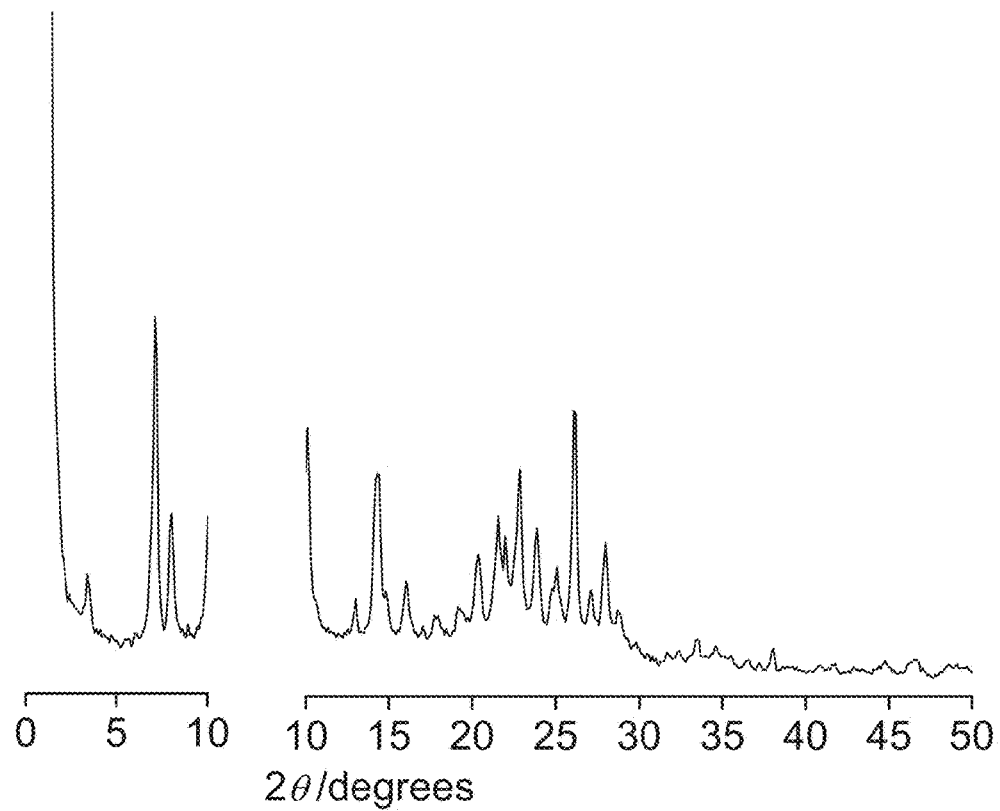
FIG. 4 shows a powder x-ray diffraction pattern characterizing MCM-22 after treatment under the same conditions used to synthesize UCB-1
Figure 5:
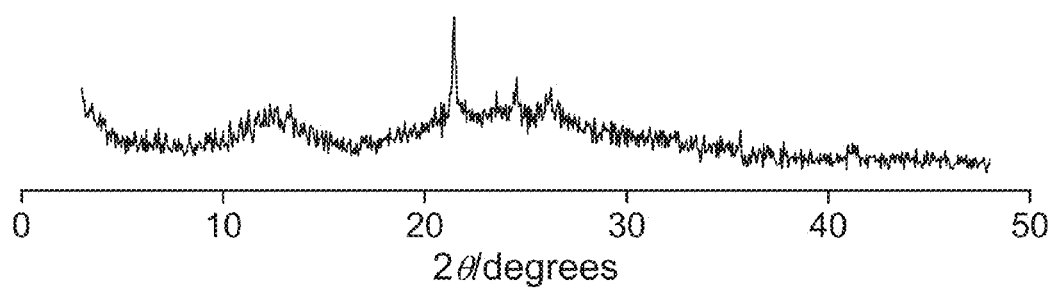
FIG. 5 shows a powder x-ray diffraction pattern characterizing MCM-22 after treatment under the same conditions used to synthesize ITQ-2 zeolite.

The mild conditions used for the present synthesis are demonstrated in comparison with those used to synthesize ITQ-2, by applying both treatments to calcined zeolite MCM-22. The treatment of calcined MCM-22 under UCB-1, (the present) synthesis conditions, leads to a product with an intense powder pattern resembling parent MCM-22, see FIG. 4. However, treatment of calcined MCM-22 under ITQ-2 synthesis conditions leads to destruction of zeolite crystallinity as evidenced by intense amorphous features and decreased overall peak intensity in the PXRD pattern, see FIG. 5. This demonstrates via direct comparison the gentler nature of the UCB-1 versus ITQ-2 synthetic conditions on the aluminosilicate framework.

Figure 6:
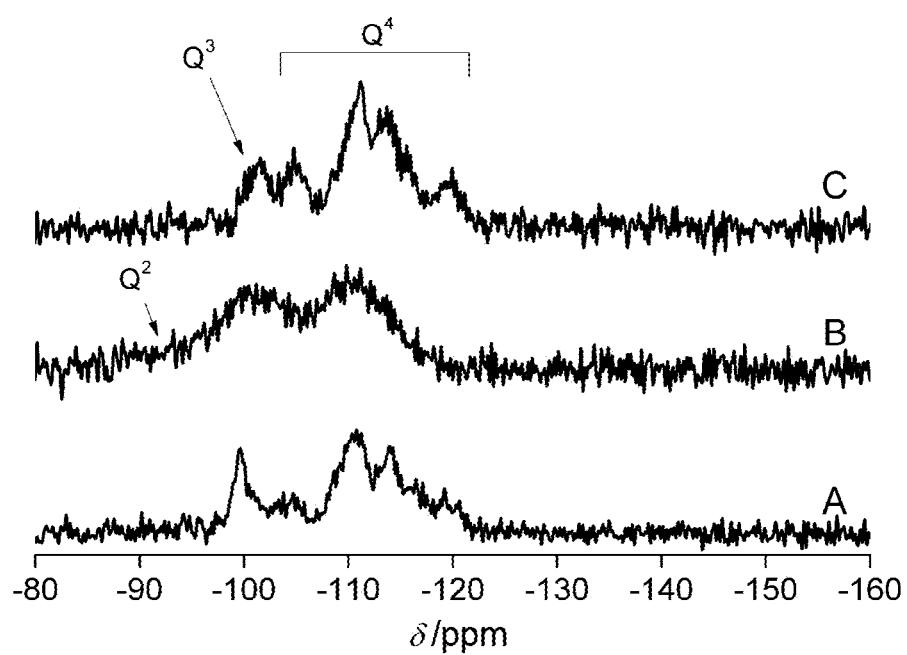
FIG. 6 shows $^{29}$Si MAS NMR spectra characterizing (A) MCM-22(P), (B) as-made ITQ-2; and (C) as-made UCB-1.

$^{29}Si$ MAS NMR spectroscopy in FIG. 6 further compares as-made materials UCB-1 and ITQ-2. Shown are NMR data characterizing (A) MCM-22(P); (B) as-made ITQ-2, and (C) as-made UCB-1. The well-resolved resonances in the $Q^4$ region ($-105<\delta<-120$ ppm) and the entire absence of $Q^2$ resonances for the spectrum in Figure C relative to Figure B means a higher degree of structural order for material UCB-1 versus ITQ-2. The observed breadth of the $Q^4$ region and appearance of $Q^2$ resonances ($\approx-91$ ppm) in Figure B for as-made ITQ-2 are consistent with amorphization of the zeolite precursor material as a result of the high pH conditions used during delamination. The $Q^2$ resonances described above for ITQ-2 are similar to those described by Corma et al., "Characterization and Catalytic Activity of MCM-22 and MCM-56 Compared with ITQ-2", Journal of Catalysis 2000, 191, 218-224.

The oxide product is collected using conventional techniques such as centrifugation. An acid treatment step can be employed prior to centrifugation, and may be conveniently conducted by contacting the swollen or partially delaminated layered zeolite precursor material with a strong acid, e.g., a mineral acid such as hydrochloric acid or nitric acid, at low pH, e.g., pH 2. Collection of the resulting oxide material product can be performed by centrifugation.

The oxide product obtained by the present process, as noted previously, depends on the starting material. Essentially any layered zeolite material can be used as a precursor in the present delamination process. In an embodiment, MCM-22 can be used as the precursor layered zeolite material, hereinafter designated as MCM-22(P). Using the preset fluoride/chloride anion promoted exfoliation procedure on MCM-22(P) results in a novel UCB-1 product. Characterization of UCB-1 product by powder x-ray diffraction, transmission electron microscopy, and nitrogen physiorption at 77K (−194° C.) indicates the same degree of delamination as for previously reported ITQ-2. Unlike ITQ-2, however, the synthesis of which requires a pH of greater than 13.5 and sonication in order to achieve exfoliation, UCB-1 is comprised of a higher degree of structural integrity and no detectable formation of amorphous silica phase.

Figure 7:
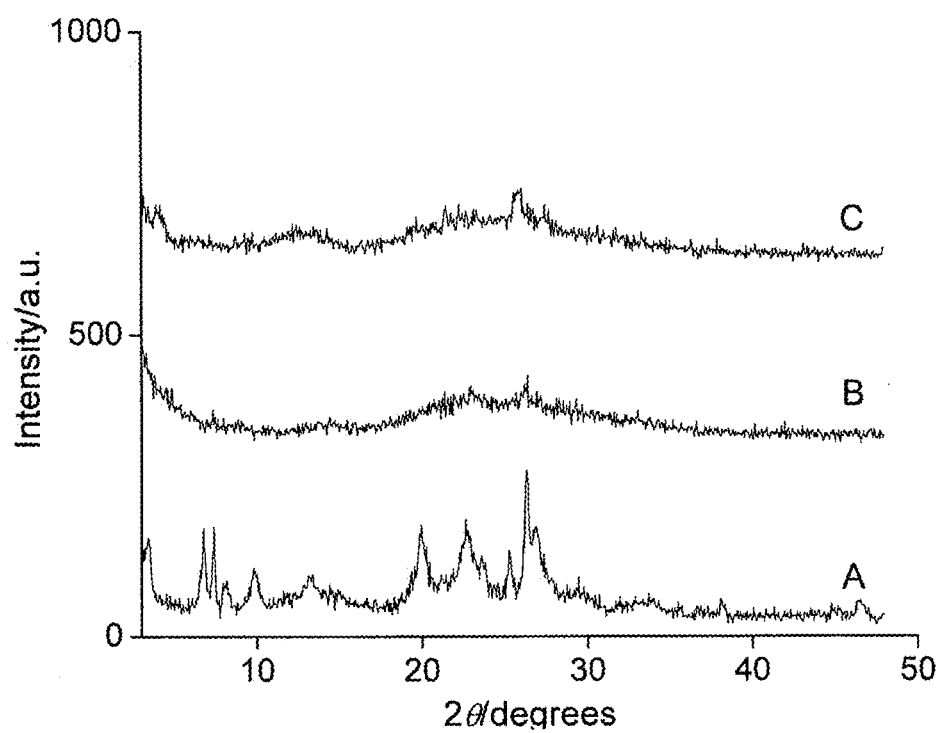
FIG. 7 shows powder x-ray diffraction patterns characterization (A) MCM-22(P); (B) as-made ITQ-2 zeolite; and (C) as-made UCB-1.

Powder X-ray diffraction patterns (PXRD) characterizing (A) MCM-22 (P), (B) ITQ-2 zeolite, and (C) new material UCB-1 are shown in FIG. 7. The powder X-ray diffraction pattern characterizing the synthesized MCM-22 (P) (FIG. 7, pattern A) matches the literature data, showing the 001 and 002 diffraction peaks at 3.3 and 6.7°, respectively. These peaks represent the lamellar structure of MCM-22 (P). Delamination of MCM-22 (P) by the method described in U.S. Pat. No. 6,231,751 leads to a significant decrease of all peaks characteristic of lamellar structure of MCM-22 (P) (FIG. 7, pattern B), in agreement with the literature results for characterizing ITQ-2 zeolite.

The PXRD of the dried UCB-1 product demonstrates a powder pattern similar to that previously reported for ITQ-2 zeolite. The pattern at FIG. 7C is characteristic of UCB-1. The 001 and 002 peaks are significantly diminished in intensity; however, the 310 peak has a stronger intensity than for material ITQ-2. This suggests a greater degree of long-range order in the direction parallel to the sheet for the material synthesized by the present fluoride/chloride delamination method. For the present oxide materials, such as UCB-1, the relative intensity ratio of the local maximum of X-ray diffraction peak in the range of 6-10 2θ/degrees to that of 20-30 2θ/degrees can be 0.50 or less.

Figure 8:
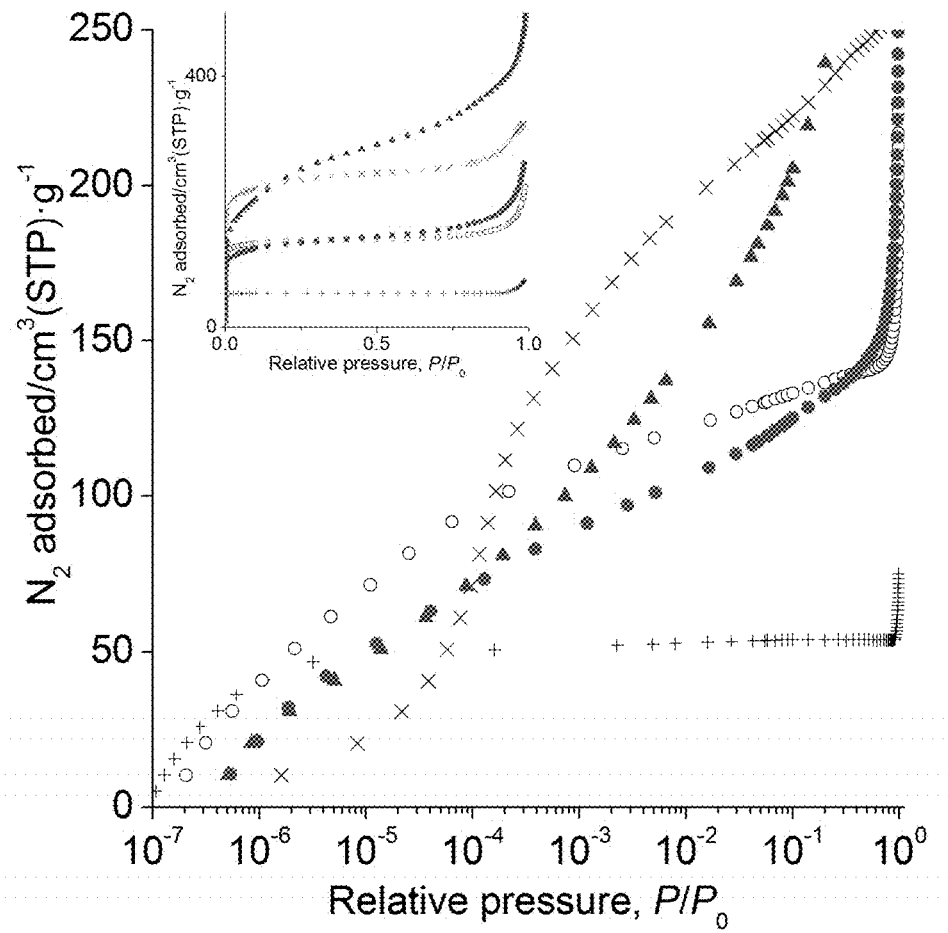
FIG. 8 shows $N_2$ adsorption isotherms characterizing the following materials: (○) MCM-22 zeolite in the semi-logarithmic scale, (▲) ITQ-2 zeolite, (●) UCB-1, (x) USY zeolite, and (+) TON zeolite. (The inset shows the data using linear scale.)
Figure 14:
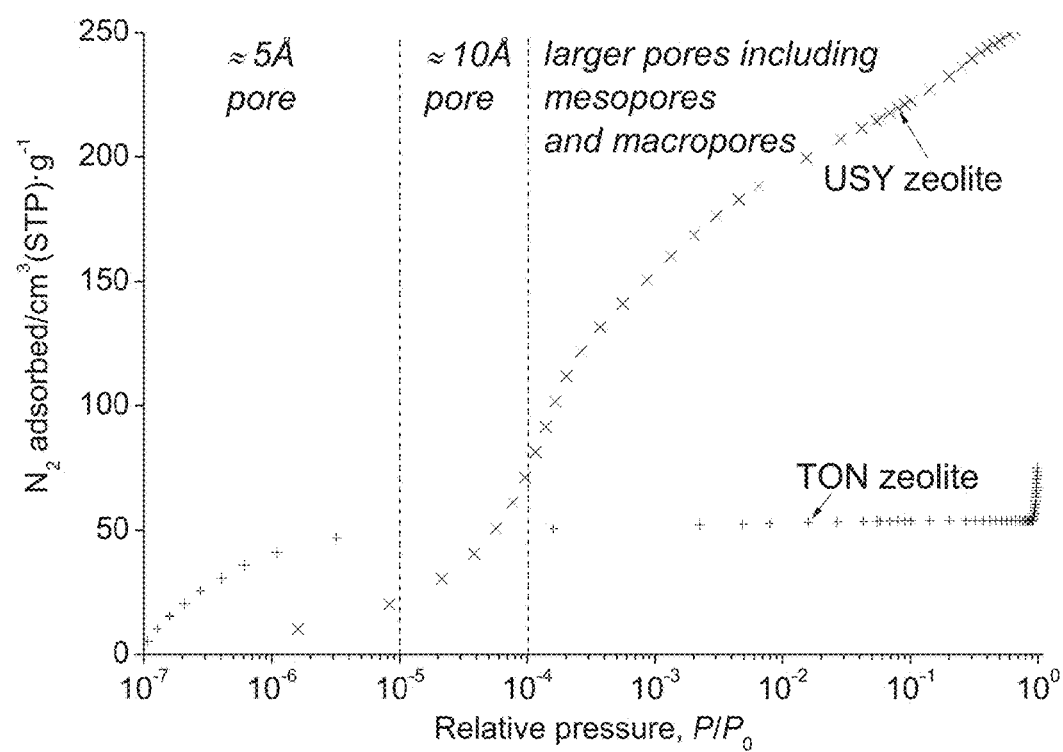
FIGS. 14 and 15 show $N_2$ adsorption isotherms and an indication of pore size.
Figure 15:
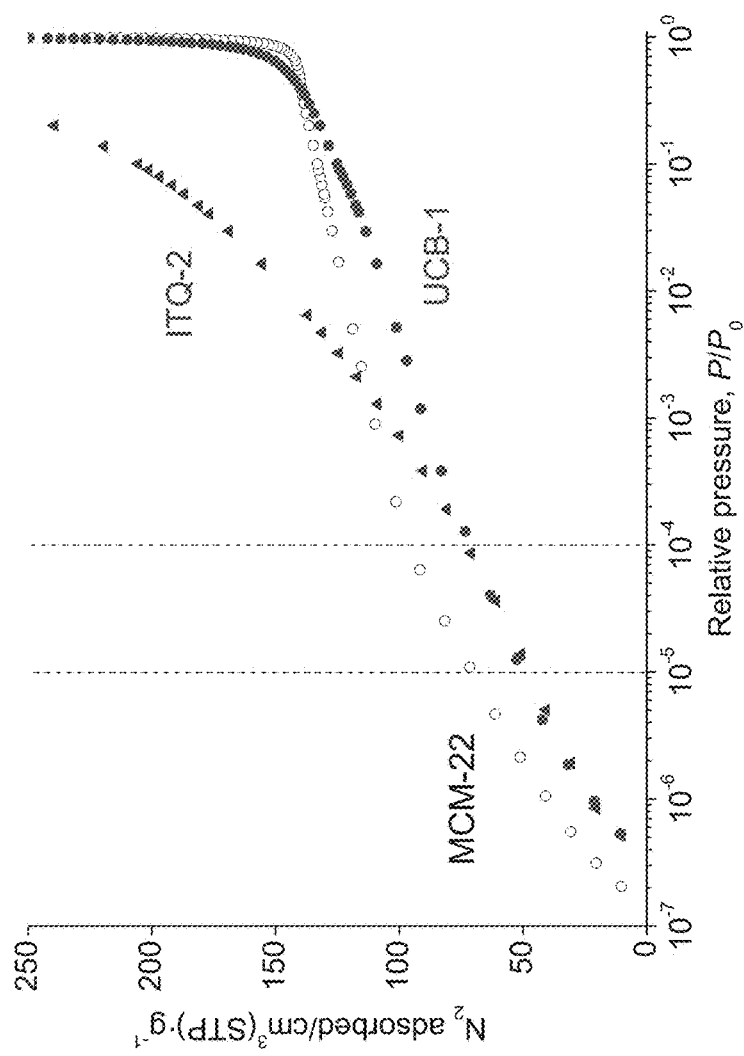

Nitrogen physisorption isotherms at 77K (−194° C.) of calcined materials UCB-1 and ITQ-2, a well as calcined zeolites MCM-22, TON, and ultrastable HY (USY) are shown in Figure B. The latter three are included as controls to elucidate where in the isotherm rings of a certain size act to physisorb nitrogen. As a reference point, calcined zeolite MCM-22 consists of two independent 10 membered-ring (MR) pore channels and 12 MR supercages, with one of the 10 MR pore channel systems running through intralayers and the other through interlayers. Therefore, the delamination of MCM-22 (P) and its subsequent calcination is expected to form a material that retains 10 MR pore channels within each layer, while the other 10 MR pore channel is expected to be significantly reduced relative to calcined MCM-22 zeolite. These expectations are indeed supported by a comparison of $N_2$ physisorption data for calcined MCM-22 and ITQ-2 in FIG. 8. These data demonstrate that at a relative pressure of approximately $10^{-7}<P/P_o<10^{-4}$, the total uptake of nitrogen into ITQ-2 is lower than that for MCM-22. Calcined zeolites TON and USY are used to further elucidate these differences. Zeolite TON consists of only 10 MR channels and shows pore filling of these channels starting at a relative pressure $P/P_o$ of $10^{-7}$. Zeolite USY consists of 12 MR windows and large (~13 Å) supercages, and shows pore filling of these pores at a relative pressure in the range of $10^{-5}<P/P_o<10^{-4}$. The isotherm for UCB-1 in FIG. 8 essentially overlaps the isotherm for ITQ-2 in the region $10^{-7}<P/P_o<10^{-4}$, which indicates that both materials have similar amounts of 10 MR and 12 MR pores. This requires that the degree of delamination for both materials is similar. However, the significantly diminished uptake of UCB-1 for relative pressures $P/P_o$ greater than $10^{-4}$ means that ITQ-2 consists of larger micropores and mesopores, which are absent in UCB-1. Because of delamination, UCB-1 has a larger pore volume of large pores than MCM-22 as shown in Table 1 below (0.36 cm³/g for UCB-1 vs. 0.22 cm³/g for MCM-22). However, ITQ-2 has a significantly larger volume than UCB-1 (0.67 cm³/g vs. 0.36 cm³/g) because of mesopore formation by amorphization. See, FIGS. 14 and 15, which show the $N_2$ adsorption isotherms with an indication of pore size.

TABLE 1

Pore volume of MCM-22, UCB-1, and ITQ-2 determined from $N_2$ gas adsorption data

| range of relative pressure | pore diameter | pore volume, cm³/g | | |
|---|---|---|---|---|
| | | MCM-22 | UCB-1 | ITQ-2 |
| $P/P_0 < 10^{-5}$ | ≈ 5 Å | 0.11 | 0.08 | 0.08 |
| $10^{-5} < P/P_0 < 10^{-4}$ | ≈ 10 Å | 0.04 | 0.03 | 0.03 |
| $10^{-4} < P/P_0 < 1.0$ | large pores including mesopore and macropore | 0.22 | 0.36 | 0.67 |

Figure 9:
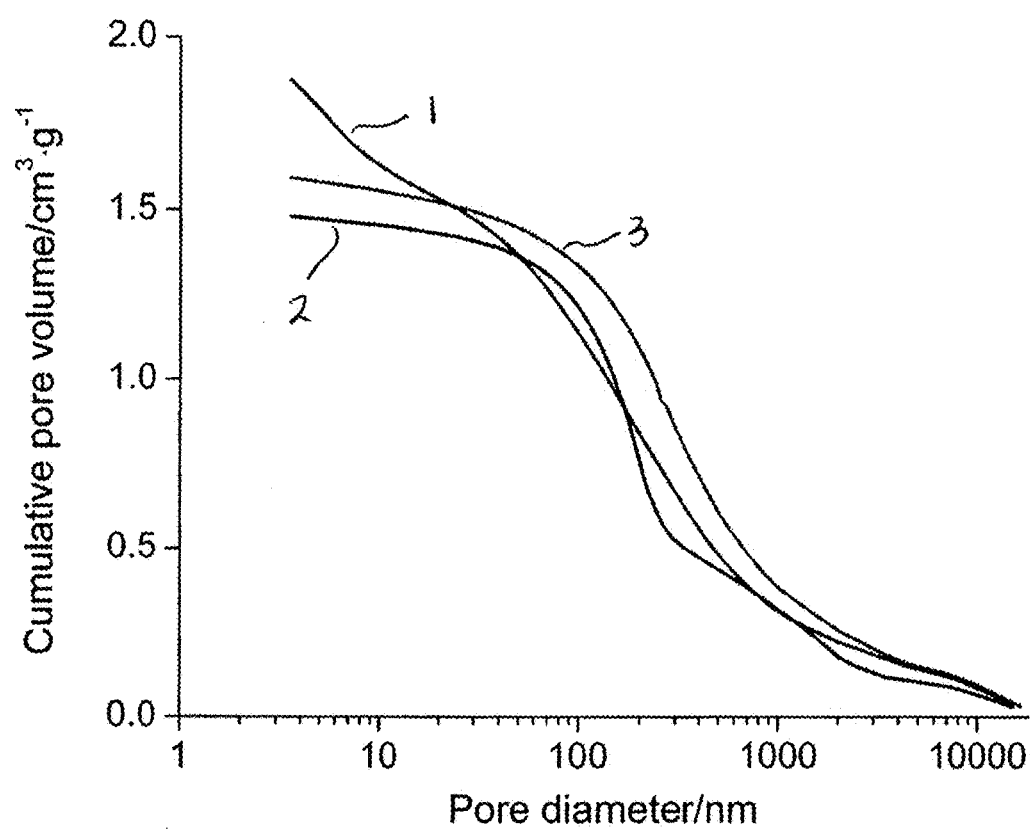
FIG. 9 shows cumulative pore volumes characterizing the following samples: (1) ITQ-2 zeolite; (2) MCM-22 zeolite; (3) UCB-1.

Mesoporosity in ITQ-2 is also evident via TEM and presumably arises due to the previously postulated amorphization of the zeolitic structure under the high pH conditions of the conventional synthesis method. The preservation of the layered structure of MCM-22 (P) within UCB-1 is evident in the large degree of macroporosity via mercury porosimetry, see FIG. 9, which is significantly smaller in ITQ-2, though both materials are synthesized from the same layered zeolite precursor. The average diameter of macroporosity in UCB-1 of 350 nm correlates well with the 0.5-1 μm microcrystalline diameter of the MCM-22 (P) used in the synthesis of UCB-I. TEM of UCB-1 demonstrates this macroporosity, which is formed between stacks of sheets, and shows the absence of mesoporosity that is evident in ITQ-2. These results in turn suggest the complete preservation of layers during delamination using the present fluoride/chloride anion-promoted method.

The MCM-22 precursor may be prepared by methods known in the art, e.g., from a reaction mixture containing an oxide of a tetravalent element (X), e.g., silicon, an oxide of a trivalent element (Y), e.g., aluminum, an organic directing agent (organic template), water and, optionally, sources of alkali or alkaline earth metal (M), e.g., sodium or potassium cation.

Examples of organic templates that may be used include heterocyclic imines (e.g., hexamethyleneimine, 1,4-diazacycloheptane and azacyclooctane), cycloaklyl amines (e.g., aminocyclopentane, aminocyclohexane and aminocycloheptane), adamantane quarternary ammonium ions (e.g., N,N,N-trimethyl-1-adamantanammonium ions and N,N,N-trimethyl-2-adamantanammonium ions), and mixtures of N,N,N-trimethyl-1-adamantanammonium ions or N,N,N-trimethyl-2-adamantanammonium ions with either hexamethyleneimine or dipropylamine.

The reaction mixture is allowed to crystallize at a temperature in the range from 80 to 225° C. for a period of 1 to 60 days. The crystals that form are separated from the reaction mixture, washed thoroughly with water and dried to yield the MCM-22 precursor.

In one embodiment, delamination of MCM-22 (P) by the present method can be conducted using an aqueous mixture of cetyltrimethylammonium bromide, tetrabutylammonium fluoride, and tetrabutylammonium chloride at pH 9 at 353 K for 16 h, which are the same temperature and duration generally used in conventional high-pH delamination methods. After acidification of the slurry to pH 2, the delaminated zeolite precursor UCB-1 is collected by centrifugation.

Figure 10:
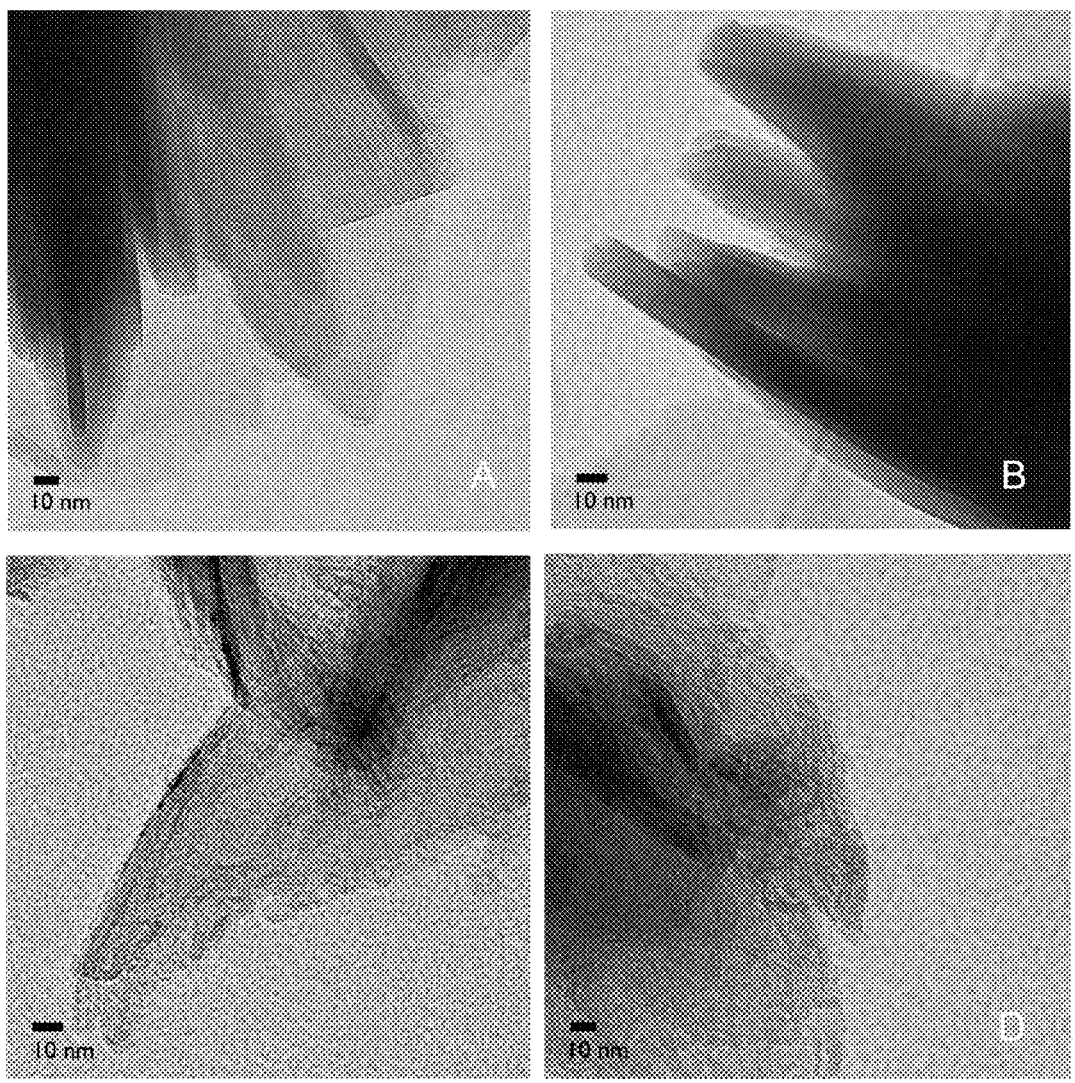
FIG. 10 are TEM images characterizing (A) and (B) MCM-22(P) and (C) and (D) UCB-1.
Figure 13:
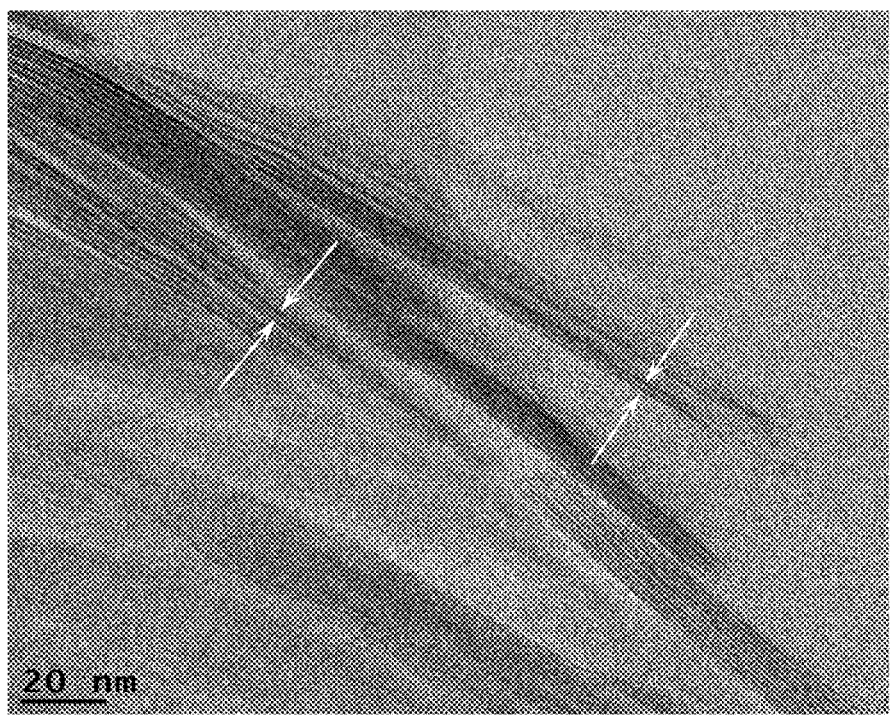
FIG. 13 is a TEM image characterizing as-made UCB-1, with the arrows indicating single-layers.

TEM images of MCM-22 (P) show lamellar assemblies consisting of rectilinear sheets, see FIGS. 10A and 10B. TEM images of UCB-1, however, clearly show curved layers (FIGS. 10C and 10D) which lack long-range order, as well as single layers of 2.5 nm thickness (FIG. 13).

Figure 11:
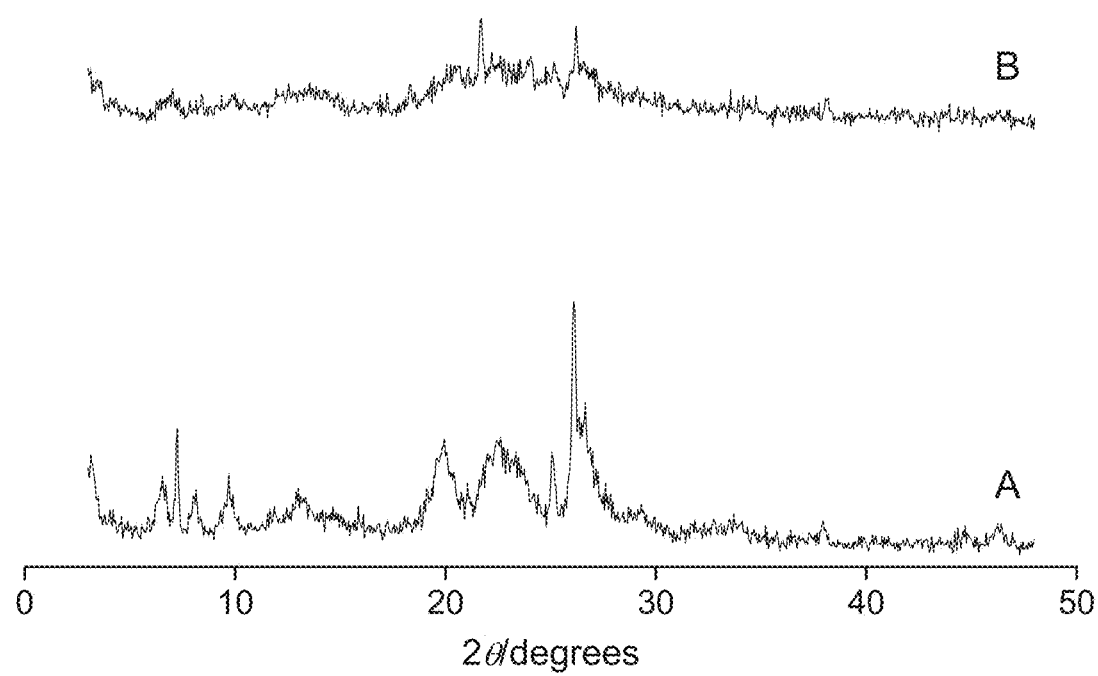
FIG. 11 shows powder X-ray diffraction patterns characterizing (A) MCM-22 (Si/Al ratio=20) and (B) the sample delaminated by the fluoride/chloride assisted method of the present process.

While the results have generally been demonstrated by using a MCM-22 (P) with a Si:Al ratio of 50, similar degrees of delamination via PXRD have been achieved on materials having a Si:Al ratio of 20. This data is shown in FIG. 11. This has been performed using similar conditions to those reported here, except that a 3 h rather than 16 h swelling time is implemented.

Figure 12:
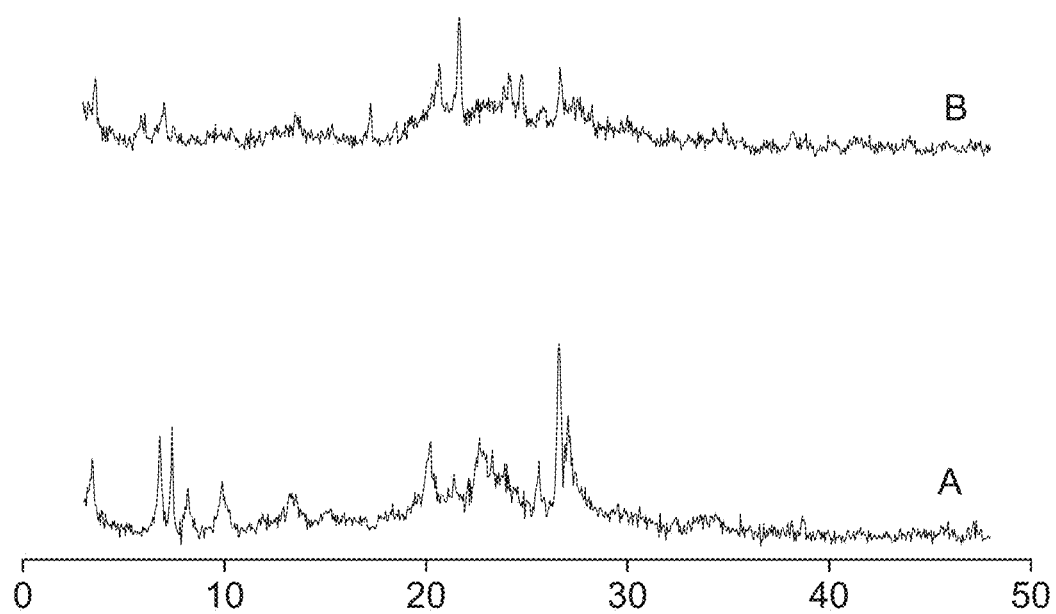
FIG. 12 shows the powder X-ray diffraction patterns characterizing (A) ERB-1 and (B) the delaminated product after delamination by the fluoride/chloride method of the present process.

The method used to synthesize UCB-1 can also be used to delaminate layered zeolite precursor materials containing boron. This has never been reported using the conventional method based on high pH presumably because it leads to degradation of the borosilicate framework. For example, as-made ERB-1 zeolite, which contains boron instead of aluminum, can essentially be delaminated by the present method as indicated by significantly decreased 001 (3.4°≈26 Å) and 002 (6.8°≈13 Å) peaks of the sample used in the present method. See FIG. 12, pattern B is the product and pattern A is the ERB-1 starting sample.

In summary, the present fluoride/chloride method successfully delaminates MCM-22 (P) at a pH of 9 in aqueous solution. The method is also able to successfully delaminate lower Si:Al ratio precursors as well as boron-containing layered zeolite precursors. As such, it presents the mildest known method for the delamination of layered zeolite precursor materials. The present method can readily be generalized to materials with varying silicon to aluminum ratios as well as a range of layered zeolite precursors.

Novel oxide products UCB-2, UCB-3, UCB-4, UCB-5 and UCB-6 can also be prepared using the present halide anion delamination process. The starting material for preparing the products is generally a layered zeolite precursor consisting of either PREFER or an SSZ-70, i.e., either Al-SSZ-70 or B-SSZ-70. The synthesis of these oxide products involves the use of a non-aqueous solution comprising an organic solvent. DMF is such a suitable solvent. For example, UCB-2, which is comprised of delaminated PREFER, is a precursor to ferrierite zeolite that contains 8 and 10 MR microchannels. The process involves the present process of halide anion delamination, and uses a non-aqueous solution for delamination. DMF has been found to be suitable as the organic solvent for the process.

Preparation of all of the foregoing products are exemplified in the following examples. The zeolite products can be used as catalysts in organic conversion processes such as catalytic cracking or alkylation reactions. The zeolite materials can be used alone, or with other catalysts, and can be supported or used in bulk. They can also be used as a support for large catalysts that would otherwise be unable to penetrate the interior microporosity of a three-dimensional zeolitic material.

Overall, the present process is advantageously flexible insofar as it can be used at milder pH values, either in organic solvents or in aqueous solution, and either with or without sonication. Such flexibility is not possible with prior art processes.

The following examples are provided to further illustrate the present materials and synthesis. The examples are meant to be illustrative, and not limiting.

Example 1

Materials.

All reagents used in the zeolite synthesis and delamination were of reagents grade quality and used as received. USY zeolite used in $N_2$ gas physisorption was received from Zeolyst International (CBV760, Si/Al ratio of 60). TON zeolite was synthesized at Chevron Energy Technology Company.

Synthesis of MCM-22 (P).

The zeolite was synthesized by the literature method. Fumed silica (Sigma Aldrich, 3.54 g) was added to an aqueous solution containing sodium hydroxide (EMD Chemicals, 97%, 0.372 g), hexamethyleneimine (Sigma Aldrich, 99%, 2.87 g), and sodium aluminate (Riedel-de Haen, 0.108 g) in deionized water (46.6 g) under vigorously stirring. After stirring the mixture for 6 h, the gel was divided into four portions and each portion was loaded into a Teflon-lined Parr reactor (23 mL). Each reactor was tightly sealed and heated in a convection oven at 408 K for 11 days with tumbling of the reactor. After 11 days of heating, the reactors were cooled down to room temperature, and the product was separated by centrifuge. The separated product was washed with deionized water thoroughly, and finally dried at 313 K overnight.

The powder X-ray diffraction (PXRD) pattern characterizing the synthesized MCM-22 (P) FIG. 7, pattern A, matches the literature data, showing the 001 and 002 diffraction peaks at 3.3 (~27 Å) and 6.7 (~13 Å), respectively. These peaks represent the lamellar structure of MCM-22 (P).

Delamination of MCM-22 (P) by the Conventional Method (Synthesis of ITQ-2 Zeolite).

MCM-22 (P) that had been prepared in the preceding section was delaminated by the literature method. Typically, an aqueous slurry of MCM-22 (P) (3.00 g, 20 wt % solid) was mixed with cetyltrimethylammonium bromide (Sigma Aldrich, ~98%, 3.38 g), tetrapropylammonium hydroxide solution (Alfa Aesar, 40 wt %, 3.67 g), and the mixture was heated at 353 K (80° C.) for 16 hours. After 16 hours of heating, the mixture was cooled down to room temperature, and subjected to sonication for 1 hour. The pH of the slurry was adjusted to 2 by adding concentrated HCl aqueous solution, upon which the solution was centrifuged to separate the product. Finally, the product was dried at 313 K (40° C.) overnight. The product yield was 75%. Powder X-ray diffraction pattern of the product (FIG. 7, pattern B) shows a significant decrease of all peaks characteristic of lamellar structure of MCM-22 (P), in agreement with the literature results.

Synthesis of UCB-1 Via Delamination of MCM-22(P).

As-made MCM-22 (P) (1.00 g) was added to a mixture of cetyltrimethylammonium bromide (1.92 g), tetrabutylammonium fluoride (Fluka, ≥90%, 1.92 g) and tetrabutylammonium chloride (Sigma Aldrich, 1.68 g) in deionized water (25.9 g). pH of the slurry was adjusted to approximately 9 by adding 40% tetrapropylammonium hydroxide solution, and the slurry was heated at 353 K (80° C.) for 16 hours. After cooling the mixture, pH of the mixture was adjusted to approximately 2 by adding concentrated HCl aqueous solution in a fume hood. The mixture was transferred to a centrifuge bottle with screw cap, and quickly centrifuged to separate a solid from a solution. The supernatant solution was discarded carefully, and the remaining solid was dried at 313 K (40° C.) overnight in the fume hood. The product yield was 90%.

Characterization.

Powder X-ray diffraction (XRD) patterns were collected on Siemens D5000 diffractometer using a Cu Kα radiation. See FIG. 7C. Transmission electron microscopy images were recorded on a Tecnai 20 or a JEOL JEM-2010 (200 kV). See FIGS. 10C and D. Nitrogen gas adsorption was measured on a Micromeritics ASAP2020 at 77 K (−194° C.). Prior to measurement, samples were evacuated at 623 K (350° C.) for 4 hours. See FIG. 8. $^{29}$Si solid-state MAS NMR spectra were measured using a Bruker Avance 500 MHz spectrometer with a wide bore 11.7 T magnet and employing a Bruker 4 mm MAS probe. The spectral frequencies were 500.23 MHz for the $^1$H nucleus and 99.4 MHz for the $^{29}$Si nucleus. $^{29}$Si MAS NMR spectra were acquired after a 4 μs-90 degree pulse with application of a strong $^1$H decoupling pulse. The spinning rate was 12 kHz, and the recycle delay time was 300 s. NMR shifts were reported in parts per million (ppm) when externally referenced to tetramethylsilane (TMS). See FIG. 6C. Mercury porosimetry was conducted according to Standard Test Method for Determining Pore Volume Distribution of Catalysts by Mercury Intrusion Prolosimetry (ASTM D 428). See FIG. 9, curve 3.

Example 2

Delamination of MCM-22 (P) without Chloride.

Delamination of MCM-22 (P) was attempted under similar conditions to those described above, except without tetrabutylammonium chloride and with twice as much as tetrabutylammonioum fluoride. The delamination was not successful. See FIG. 1.

Example 3

Synthesis of ERB-1.

ERB-1 was synthesized by the literature method. (Millini, et al., *Microporous Materials*, (1995) v. 4, p. 221). Sodium hydroxide (EMD Chemicals, 97%, 0.653 g) and piperidine (Sigma Aldrich, 99%, 6.360 g) were dissolved into deionized water (16.228 g). Boric acid (J. T. Baker, 4.396 g) was added to the mixture, and the whole mixture was stirred at 323 K until the boric acid was completely dissolved. After cooling down the solution to room temperature, fumed silica (Sigma Aldrich, 3.300 g) was added gradually over 1 hour. The whole mixture was stirred for an additional 5 h, and divided into half. Each gel was transferred into a Teflon-lined autoclave (Parr instrument, 23 mL). Each reactor was tightly sealed and heated in a convection oven at 448 K for 7 days with tumbling of the reactor. After 7 days of heating, the reactors were cooled down to room temperature, and the product was separated by centrifugation. The separated product was washed with deionized water thoroughly, and finally dried at 313 K overnight. The powder X-ray diffraction (PXRD) pattern characterizing the synthesized ERB-1 (pattern A in FIG. 12) matches literature data showing the 001 and 002 diffraction peaks at 3.4° and 6.8°, respectively. These peaks represent a lamellar structure of ERB-1.

Delamination of as-Made ERB-1 Via Fluoride/Chloride Anion-Promoted Exfoliation.

As-made ERB-1 (0.381 g) was added to a mixture of cetyltrimethylammonium bromide (Sigma Aldrich, 2.192 g), tetrabutylammonium fluoride (Fluka, ≥90%, 0.761 g) and tetrabutylammonium chloride (Sigma Aldrich, 0.638 g) in deionized water (15.51 g). The pH of the slurry was adjusted to approximately 9 by adding 40% tetrapropylammonium hydroxide solution, and the slurry was heated at 353 K for 16 hours. After cooling the mixture, the pH of the mixture was adjusted to approximately 2 by adding concentrated HCl aqueous solution in a fume hood. The mixture was transferred to a centrifuge bottle with screw cap, and quickly centrifuged to separate the solids. The supernatant solution was discarded, and the solid was dried at 313 K (40° C.) overnight. The product was then characterized as in Example 1. See FIG. 12, pattern B.

Example 4

Materials.

All reagents used in zeolite synthesis and delamination were of reagent-grade quality and were used as received.

Synthesis of PREFER.

Figure 16:
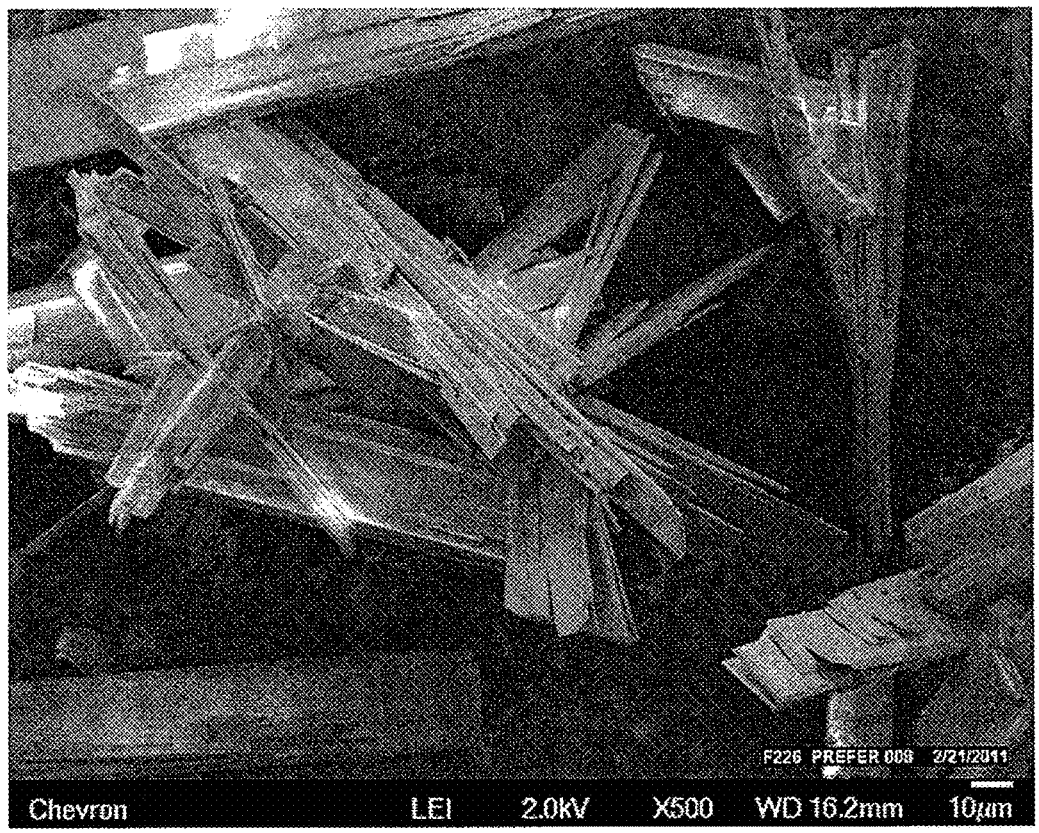
FIG. 16 shows a scanning electron microscopy image characterizing PREFER.

A typical synthesis of PREFER was made by mixing 1.60 g fumed silica with 0.38 g alumina (bohemite, Catapal B). A mixture of 1.47 g $NH_4F$ and 0.50 g HF (49%) was added subsequently and the highly viscous gel was stirred using a spatula until homogenous. A mixture of 4.16 g 4-amino-2,2,6,6-tetramethylpiperidine (Aldrich, 98%) and 4.43 g $H_2O$ (Deionized) was added and the gel was stirred until homogenous. The gel was transferred to a 25 mL teflon lined Parr stainless steel autoclave and heated at 175° C. for 5 days in a tumbling oven at 60 rpm. FIG. 16 is a scanning electron microscopy image characterizing PREFER.

Synthesis of UCB-2 Via Delamination of PREFER.

Figure 17:
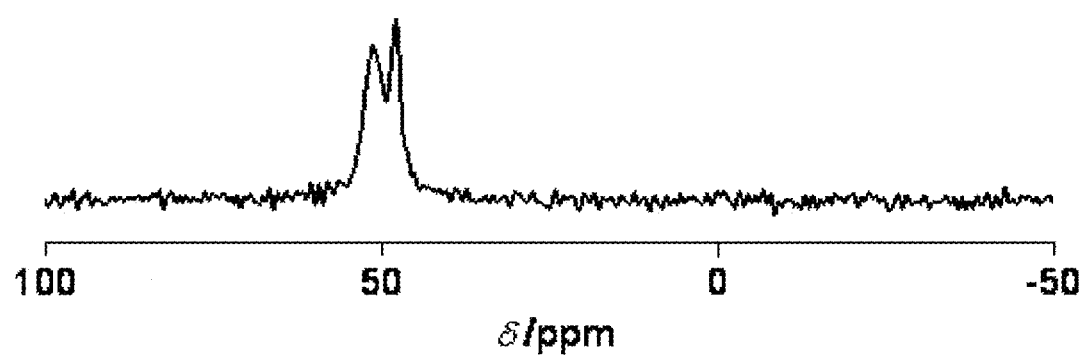
FIG. 17 shows solid-state $^{27}$Al MAS NMR spectra characterizing as-made UCB-2.

PREFER was swollen by mixing 10.00 g dimethyl formamide (DMF), 0.85 g cetyltrimethyl-ammonium bromide (CTAB), 0.85 g tetrabutylammonium fluoride (TBAF), 0.85 g tetrabutyl-ammonium chloride (TBACl) and 0.50 g PREFER in a 25 mL teflon lined Parr stainless steel autoclave. The mixture was heated for 16 hours at 100° C. in a tumbling oven at 60 rpm. After swelling, approximately 20 drops of concentrated HCl aq. was added and the product was recovered by filtration through a fine glass filter. FIG. 17 is a solid state $^{27}$Al MAS NMR spectra characterizing the as-made UCB-2.

Delamination of PREFER without Chloride.

Delamination of PREFER was attempted under similar conditions to those described above, except without tetrabutylammonium chloride and with twice as much as tetrabutylammonium fluoride. In the absence of chloride, PREFER is swollen. This is indicated by the disappearance of the 200 peak and appearance of three new peaks in the PXRD pattern. However, addition of HCl to the slurry leads to the complete disappearance of these new peaks and appearance of peaks resembling calcined PREFER. These results indicate that absence of chloride results in the condensation of layers upon acidification and does not result in delamination.

Delamination of PREFER without Fluoride.

Delamination of PREFER was attempted under similar conditions to those described above, except without tetrabutylammonium fluoride and with twice as much as tetrabutylammonium chloride. Treating PREFER with DMF in the absence of fluoride results in a lack of PREFER swelling. This result shows that fluoride is a necessary component for delamination.

Reversibility Test Between Swelling and Delamination.

Figure 18:
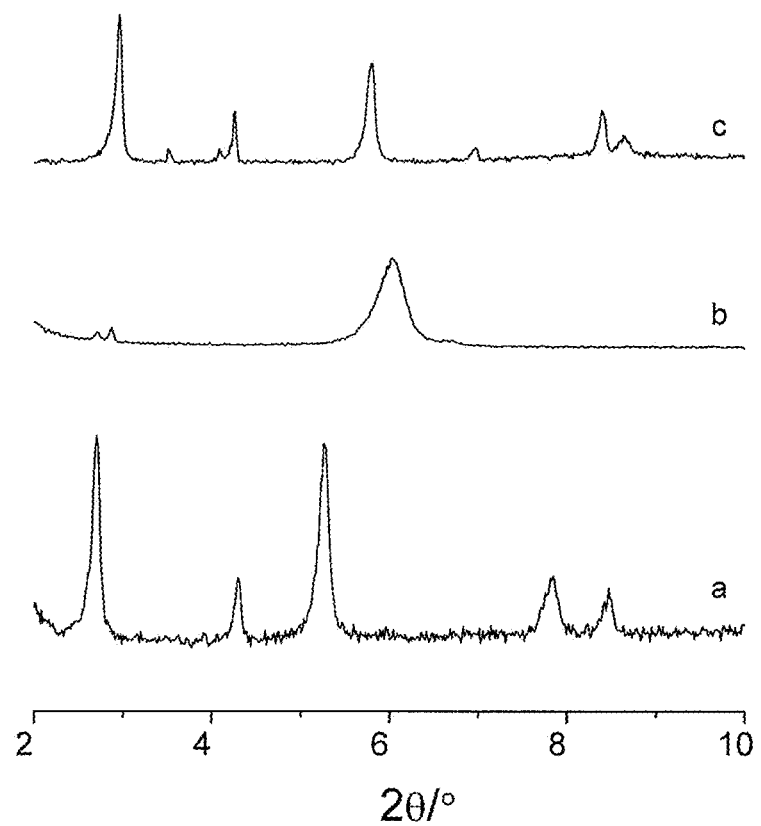
FIG. 18 shows powder XRD patterns characterizing the following materials: (a) swollen PREFER in DMF; (b) acidified PREFER; (c) material formed by swelling the acidified PREFER.

To test whether the acidification step leads to irreversible condensation of the layers, the delaminated UCB-2 was washed thoroughly in water 5 times and subjected to a new delamination process with CTAB, TBAF and TBACl. The objective was to see if this treatment is able to swell the material. 0.50 g washed UCB-2 was mixed with 0.85 g CTAB, 0.85 g TBAF, and 0.85 g TBACl, and 10.00 g DMF in a 25 mL teflon lined Parr stainless steel autoclave. The mixture was heated for 16 hours at 100° C. in a tumbling oven at 60 rpm. FIG. 18 shows powder XRD patterns characterizing swollen PREFER in DMF, acidified PREFER and the material formed by swelling the acidified PREFER.

Characterization.

Powder X-ray diffraction (XRD) patterns were collected on a Bruker D8 Advance diffractometer using a Cu Kα radiation. Transmission electron microscopy images were recorded on a JEOL JEM-2010 (200 kV). Argon gas adsorption isotherms were measured on a Micromeritics ASAP2020 at 86 K. Prior to measurement, samples were evacuated at 623 K for 4 h. $^{29}$Si solid-state MAS NMR spectra were measured using a Bruker Avance 500 MHz spectrometer with a wide bore 11.7 T magnet and employing a Bruker 4 mm MAS probe. The spectral frequencies were 500.23 MHz for the 1H nucleus and 99.4 MHz for the $^{29}$Si nucleus. $^{29}$Si MAS NMR spectra were acquired after a 4 μs-90 degree pulse with application of a strong $^1$H decoupling pulse. The spinning rate was 12 kHz, and the recycle delay time was 300 s.

Example 5

Synthesis and Characterization of UCB-3 Via Delamination of PREFER

A mixture of PREFER (0.20 g), cetyltrimethylammonium bromide (CTAB, 0.22 g), tetrabutylammonium fluoride (TBAF, 0.34 g), tetrabutylammonium chloride (TBACl, 0.34 g) in N,N-dimethyl formamide (4 mL) was heated in a sealed PFA tube at 373 K for 16 h. After 16 h of heating, the mixture was cooled to room temperature, and the solid was separated by filtration. The solid was extensively washed with deionized water, and dried at 323 K overnight. The synthesized material is designated as UCB-3. An advantage of this synthesis procedure relative to UCB-2, which also results from PREFER delamination, is that neither an acidification step nor acid are required.

Figure 19:
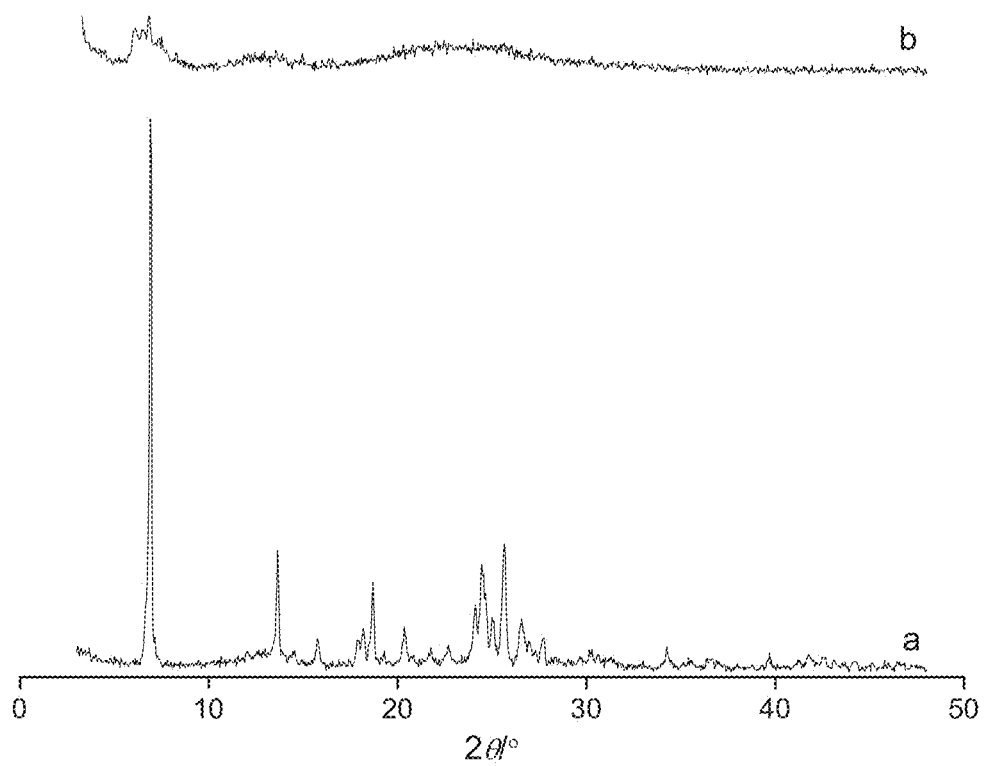
FIG. 19 shows powder XRD patterns characterizing (a) PREFER and (b) as-made UCB-3.

Powder XRD (PXRD) characterizing UCB-3 shown in FIG. 19 shows significant decrease and broadening of 200 peak (6.8°, 13 Å) as compared with that of PREFER (FIG. 19) as PREFER is delaminated by the treatment.

Figure 20:
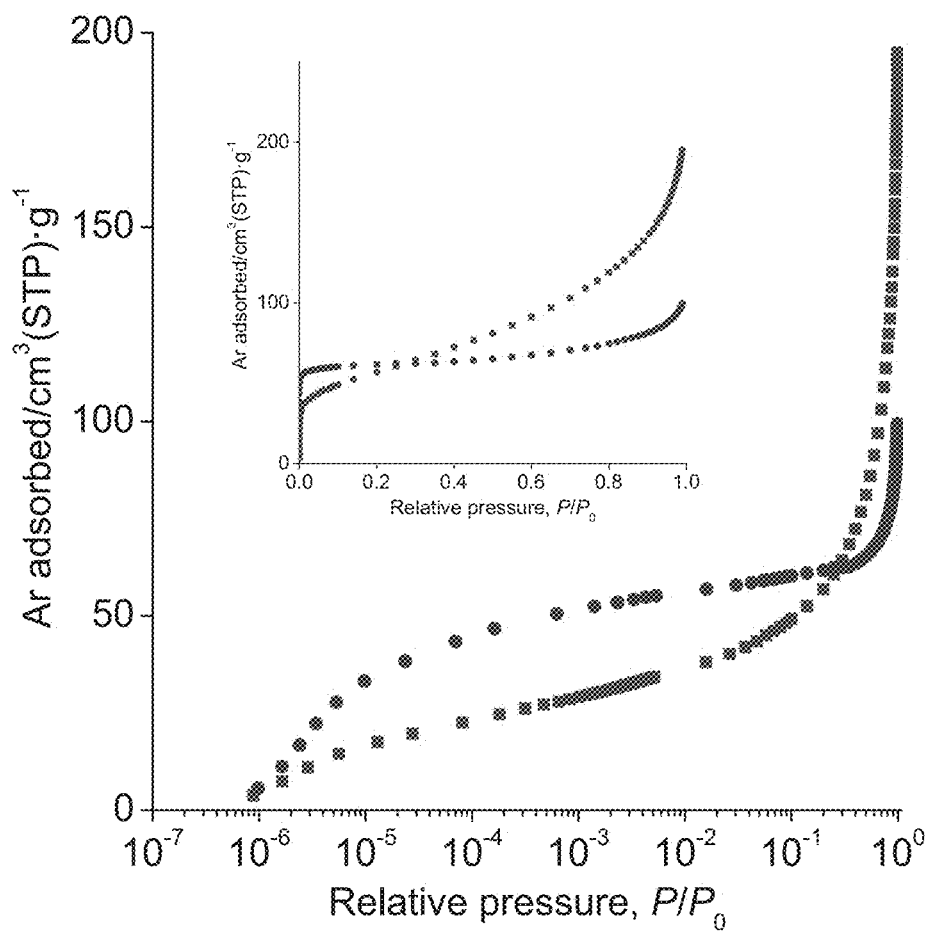
FIG. 20 shows argon gas adsorption characterizing (●) calcined PREFER (ferrierite), and (■) calcined UCB-3 in a semi-logarithmic scale. The inset shows the same data in a linear scale.

Argon gas physisorption isotherms of calcined materials are shown in FIG. 20. Table 2 represent micropore volumes, external surface area, and total pore volumes. Comparison of these results shows a significant decrease in the micropore volume of UCB-3, along with an increase in the external surface area, relative to calcined PREFER, as expected for delamination of PREFER layers.

TABLE 2

Results from argon gas adsorption experiments of calcined PREFER and UCB-3

| Sample | micropore volume (cm$^3$/g) | total pore volume (cm$^3$/g) | S$_{ext}$ (m$^2$/g) |
|---|---|---|---|
| Calcined PREFER | 0.07 | 0.13 | 18 |
| Calcined UCB-3 | 0.006 | 0.25 | 152 |

Example 6

Synthesis and Characterization of UCB-4 Via Delamination of PREFER

A mixture of PREFER (0.20 g), cetyltrimethylammonium bromide (CTAB, 0.22 g), tetrabutylammonium fluoride (TBAF, 0.34 g), tetrabutylammonium chloride (TBACl, 0.34 g) in N,N-dimethyl formamide (4 mL) was heated in a sealed PFA tube at 373 K for 16 h. After cooled to room temperature, the slurry was subjected to sonication in an ice bath for 1 h. Then, the solid was separated by filtration, and washed with about 50 mL of DMF. After separation by filtration, the solid was dried at 323 K overnight. The synthesized material is designated as UCB-4. This synthesis, like that of UCB-3, obviates the need for acidification and acid use, though, unlike UCB-3, it involves sonication.

Figure 21:
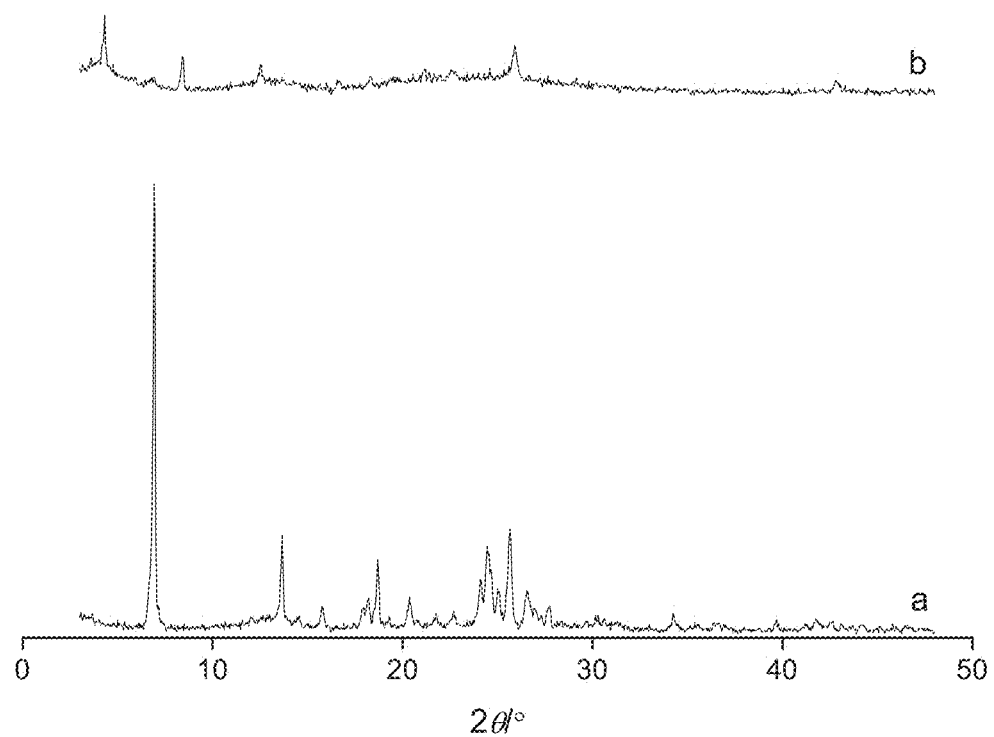
FIG. 21 shows powder XRD patterns characterizing (a) PREFER and (b) as-made UCB-4.

Powder XRD (PXRD) characterizing UCB-4 shown in FIG. 21 shows disappearance of 200 peak (6.8°, 13 Å) as compared with that of PREFER (FIG. 21) following the treatment described above. A distinctive advantage of UCB-4 relative to UCB-3 is a higher extent of delamination, as indicated by the complete absence of the (200) peak in FIG. 21 (i.e. compare with intensity of this broad peak in FIG. 19).

Figure 22:
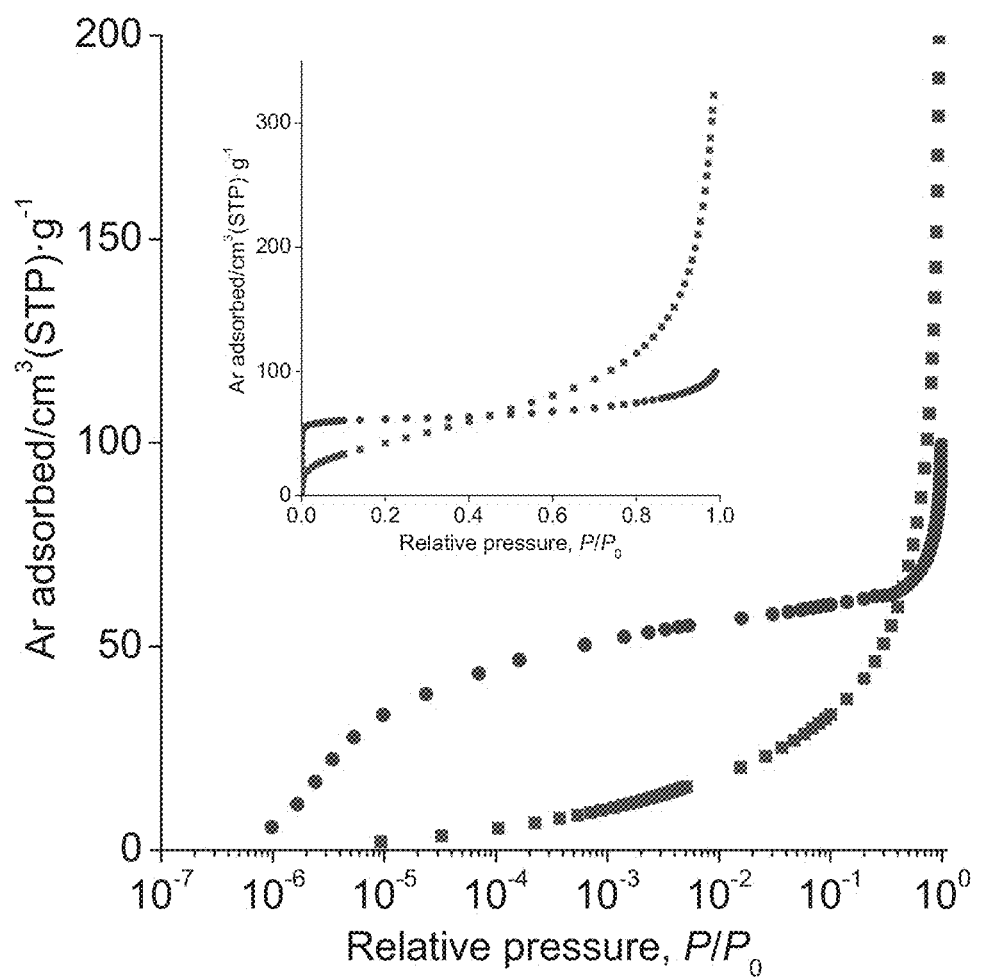
FIG. 22 shows argon gas adsorption isotherms characterizing (●) calcined PREFER (ferrierite), and (■) calcined UCB-4 in a semi-logarithmic scale. The inset shows the same data in a linear scale. The data for calcined PREFER is shown as a comparison.

Argon gas physisorption of calcined materials are shown in FIG. 22. UCB-4 consists of a micropore volume that is less than 0.001 cm$^3$/g, an external surface area of 171 m$^2$/g, and a total pore volume of 0.51 cm$^3$/g.

Comparison of these results with those of calcined PREFER as well as calcined UCB-3 shows a significant decrease in the micropore volume of UCB-4 and an increase in the external surface area, relative to both PREFER and UCB-3. These data are consistent with PREFER delamination in UCB-4, and an even greater degree of PREFER delamination in UCB-4 than in UCB-3.

Example 7

Synthesis of Al-SSZ-70

A gel consisting of aluminum hydroxide (53 wt % as Al2O3, 0.171 g), distilled water (6.88 g), diisobutylimidazolium hydroxide solution (0.50 mmol/g, 35.6 g), sodium hydroxide solution (1N, 8.89 g), and fumed silica (5.50 g) was divided into four portions. Each gel was heated in a 23-mL Teflon-lined autoclave at 423 K with tumbling for 11 days. After the reaction mixtures were cooled down to room temperature, and the solid was separated by filtration, and subsequently washed with distilled water. The solid was dried at 353 K overnight.

Synthesis and Characterization of UCB-5 Via Delamination of Al-SSZ-70

A mixture of Al-SSZ-70 (0.20 g), cetyltrimethylammonium bromide (CTAB, 0.22 g), tetrabutylammonium fluoride (TBAF, 0.34 g), tetrabutylammonium chloride (TBACl, 0.34 g) in N,N-dimethyl formamide (4 mL) was heated in a sealed PFA tube at 373 K for 16 h. After cooling to room temperature, the slurry was subjected to sonication in an ice bath for 1 h. Then, the solid was separated by filtration, and washed with about 50 mL of DMF. After separation by filtration, the solid was dried at 323 K overnight. The synthesized material is designated as UCB-5.

Figure 23:
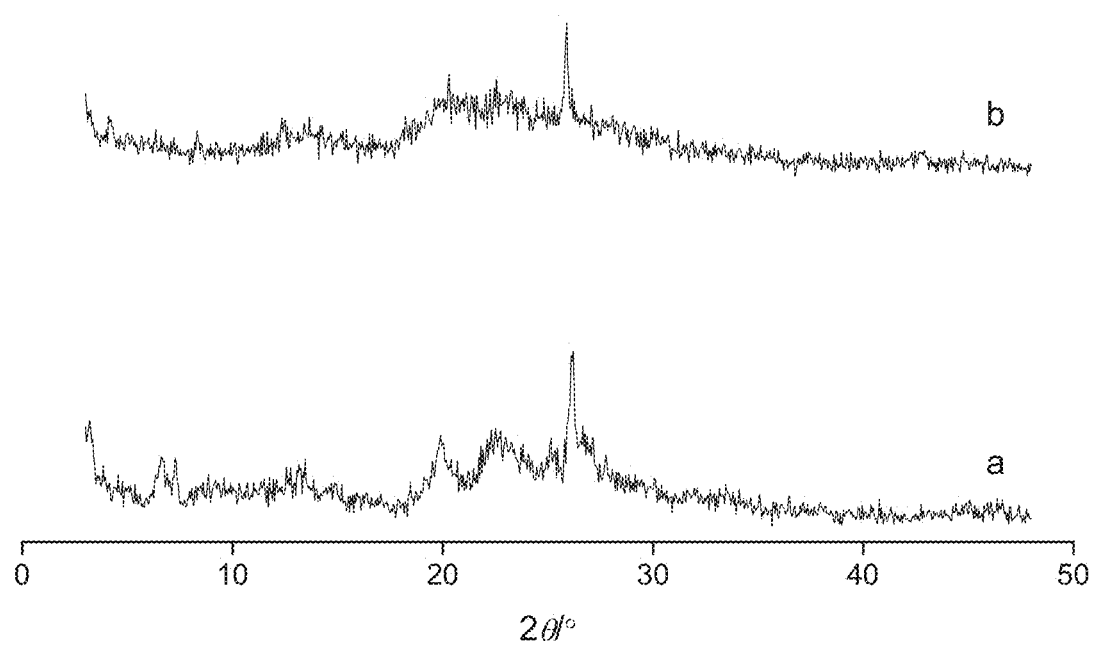
FIG. 23 shows powder XRD patterns characterizing (a) as-made Al-SSZ-70 and (b) as-made UCB-5.

Powder XRD (PXRD) characterizing as-made Al-SSZ-70 and UCB-5 are shown in FIG. 23. The pattern characterizing Al-SSZ-70 (FIG. 23a) shows a peak at 6.6° (13.4 Å) that represents the lamellar structure of this material. The pattern for UCB-5 (FIG. 23b) shows complete disappearance of this peak, as layers in Al-SSZ-70 have become delaminated.

Figure 24:
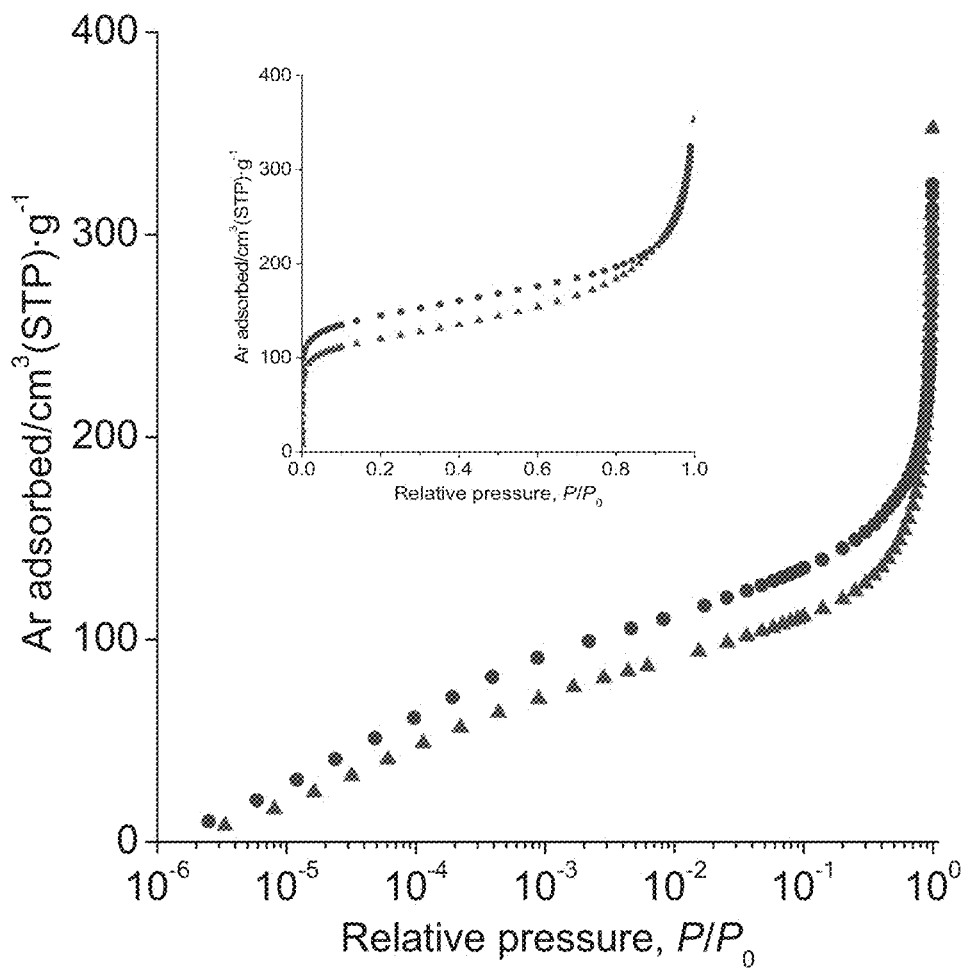
FIG. 24 shows argon gas adsorption isotherms characterizing (●) calcined Al-SSZ-70 and (▲) calcined UCB-5 in a semi-logarithmic scale. The inset shows the same data in a linear scale.

Argon gas physisorption data of calcined materials are shown in FIG. 24. Table 3 summarizes corresponding micropore volumes, external surface area, and total pore volumes. Comparison of these results shows a significant decrease in the micropore volume for UCB-5, along with an increase in the external surface area, as expected for delamination of Al-SSZ-70 layers.

TABLE 3

Results from argon gas adsorption experiments of calcined Al-SSZ-70 and UCB-5

| Sample | micropore volume (cm3/g) | total pore volume (cm3/g) | Sext (m2/g) |
|---|---|---|---|
| calcined Al-SSZ-70 | 0.16 | 0.33 | 89 |
| calcined UCB-5 | 0.10 | 0.35 | 135 |

Example 8

Synthesis of B-SSZ-70

A gel consisting of boric acid (0.172 g), distilled water (2.52 g), diisobutylimidazolium hydroxide solution (0.48 mmol/g, 17.7 g), sodium hydroxide solution (1N, 4.20 g), and fumed silica (2.60 g) was divided into two portions. Each gel was heated in a 23-mL Teflon-lined autoclave at 423 K with tumbling for 17 days. After the reaction mixtures were cooled down to room temperature, and the solid was separated by filtration, and subsequently washed with distilled water. The solid was dried at 353 K overnight.

Synthesis and Characterization of UCB-6 Via Delamination of B-SSZ-70

A mixture of B-SSZ-70 (0.20 g), cetyltrimethylammonium bromide (CTAB, 0.22 g), tetrabutylammonium fluoride (TBAF, 0.34 g), tetrabutylammonium chloride (TBACl, 0.34 g) in N,N-dimethyl formamide (4 mL) was heated in a sealed PFA tube at 373 K for 16 h. After cooled to room temperature, the slurry was subjected to sonication in an ice bath for 1 h. Then, the solid was separated by filtration, and washed with about 50 mL of DMF. After separation by filtration, the solid was dried at 323 K overnight. The synthesized material is designated as UCB-6.

Figure 25:
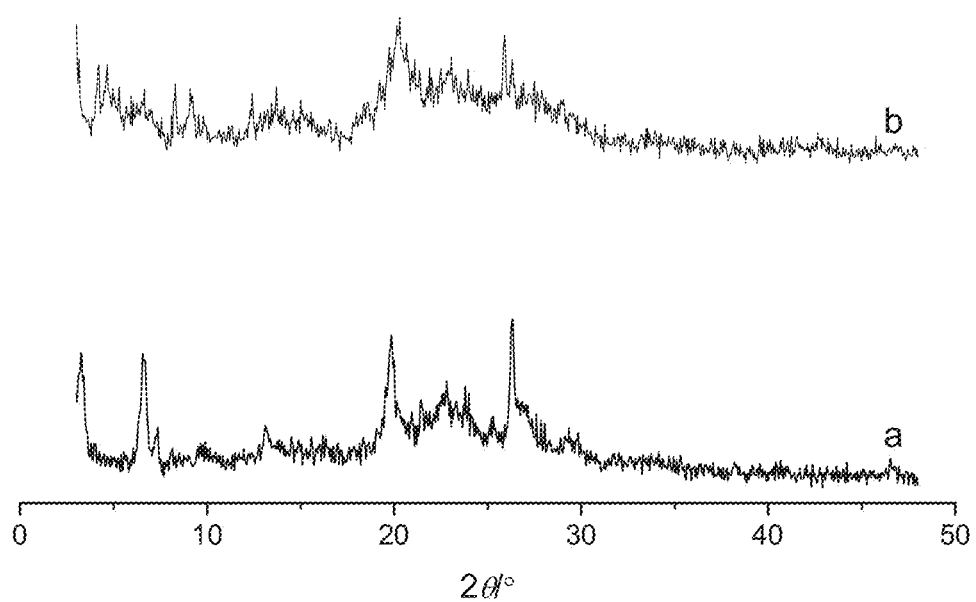
FIG. 25 shows powder XRD patterns characterizing (a) as-made B-SSZ-70 and (b) as-made UCB-6.

Powder XRD (PXRD) characterizing as-made B-SSZ-70 and UCB-6 are shown in FIG. 25. The pattern characterizing B-SSZ-70 (FIG. 25a) shows a peak at 6.6° (13.4 Å) that represent lamellar structure of this material. The pattern for UCB-6 (FIG. 25b) shows a significant decrease and broadening of this peak, consistent with delaminated B-SSZ-70 layers.

Figure 26:
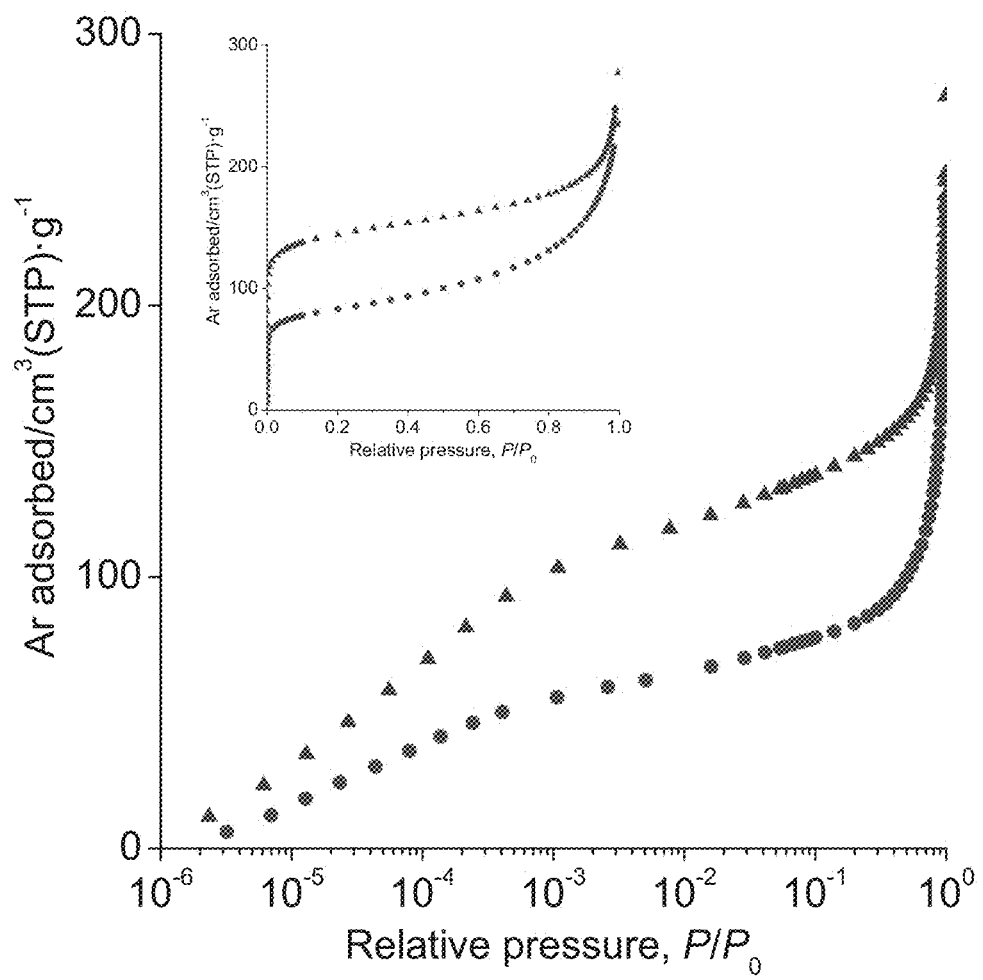
FIG. 26 shows argon gas adsorption characterizing (▲) calcined B-SSZ-70 and (●) calcined UCB-6 in a semi-logarithmic scale. The inset shows the same data in a linear scale.

Argon gas physisorption data of calcined materials are shown in FIG. 26. Table 4 summarizes corresponding micropore volumes, external surface area, and total pore volumes. Comparison of these results shows a significant decrease in the micropore volume for UCB-6, along with an increase in the external surface area, as expected for delamination of B-SSZ-70 layers.

TABLE 4

Results from argon gas adsorption experiments of calcined B-SSZ-70 and UCB-6

| Sample | micropore volume (cm3/g) | total pore volume (cm3/g) | Sext (m2/g) |
|---|---|---|---|
| calcined B-SSZ-70 | 0.15 | 0.34 | 74 |
| calcined UCB-6 | 0.06 | 0.30 | 105 |

Approximately 30 mg of UCB-1 was calcined at 550° C. for 2 h in flowing dry nitrogen in thermogravimetric analyzer (TA Instruments, model TA2920). After cooling the calcined UCB-1 down to 150° C. under the same dry nitrogen stream, 50 μL of pyridine base probe molecule was injected into the inlet gas flow line via syringe. The probe molecule adsorbed on acid sites of UCB-1. After the temperature was kept at 150° C. for 30 h, the temperature of the sample was ramped up to 250° C. and held there for 2 h. Then, the temperature of the sample was ramped up to 350° C. and held there for 2 h. The same set of experiments was conducted with bulky pyridines such as 2,6-di-tert-butylpyridine (DTBP) and collidine.

Figure 27:
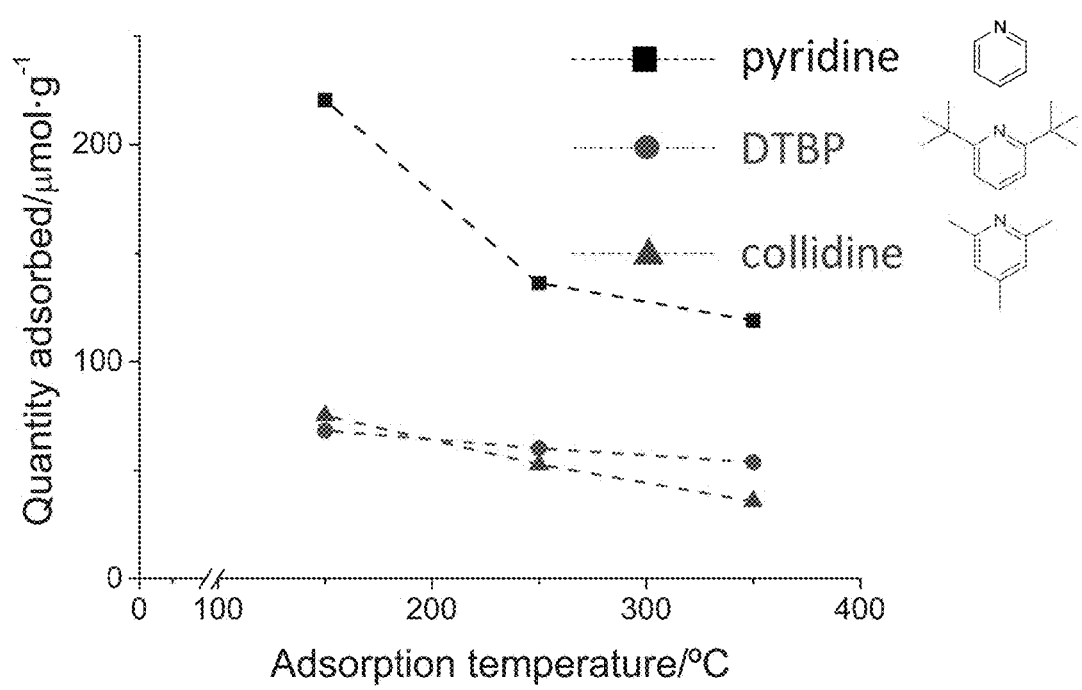
FIG. 27 shows chemisorbed amounts of base molecules onto acid sites in calcined material UCB-1.

FIG. 27 shows chemisorbed amounts of base molecules at 150-350° C. The results show that approximately 30-45% of acid sites accessible to pyridine are also accessible to DTBP or collidine. This large fraction of either DTBP- or collidine-accessible sites is due to the large fraction of acid sites near the external surface, as a result of delaminated layers in UCB-1.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method of preparing an exfoliated layered zeolite precursor material comprising preparing a non-aqueous mixture of chloride and fluoride anions comprising an organic solvent and a layered oxide material to be delaminated, maintaining the mixture at a temperature in the range of 50-150° C. for a length of time sufficient to effect the desired delamination; and then recovering the delaminated oxide material.

2. The method of claim 1, wherein the organic solvent comprises DMF.

3. The method of claim 1, wherein the mixture, after heating, is subjected to sonication, after which the delaminated oxide material is recovered.

4. The method of claim 1, wherein the layered oxide material to be delaminated is selected from the group consisting of SSZ-25, ERB-1, PREFER, SSZ-70, Nu-6(1), Al-SSZ-70 and B-SSZ-70.

5. The method of claim 1, wherein the layered oxide material to be delaminated is PREFER, Al-SSZ-70 and B-SSZ-70.

6. The method of claim 1, wherein the mixture is subjected to sonication prior to recovering the delaminated oxide material.

7. The method of claim 1, wherein the non-aqueous mixture of chloride and fluoride anions comprises a mixture of an alkylammonium fluoride and chloride.

8. The method of claim 7, wherein the alkylammonium fluoride and chloride compounds are tetrabutylammonium compounds.

9. The method of claim 1, wherein bromide anions are also present in the non-aqueous mixture.

10. The method of claim 1, wherein the non-aqueous mixture comprises an alkylammonium bromide.

11. The method of claim 10, wherein the alkylammonium bromide compound is cetyltrimethylammonium bromide.

12. The method of claim 1, wherein the temperature is in the range of about 50-100° C.

13. The method of claim 1, wherein the non-aqueous mixture is maintained for a period of time ranging from about 30 minutes to one month.

14. The method of claim 1, wherein the non-aqueous mixture is maintained for a period of time ranging from about 2 to 50 hours.

15. The method of claim 1, wherein the product recovered is UCB-2, UCB-3, UCB-4, UCB-5 or UCB-6.

16. The method of claim 1, wherein the non-aqueous mixture is acidified prior to recovering the product.

17. The method of claim 1, wherein the molar ratio of chloride to fluoride anions in the aqueous mixture is from 100:1 to 1:100.

* * * * *